(12) United States Patent
Kurushima

(10) Patent No.: US 7,979,326 B2
(45) Date of Patent: Jul. 12, 2011

(54) PROFIT-AND-LOSS MANAGEMENT INFORMATION PRESENTATION METHOD, PROFIT-AND-LOSS MANAGEMENT INFORMATION PRESENTATION DEVICE, AND PROFIT-AND LOSS MANAGEMENT INFORMATION PRESENTATION PROCESS PROGRAM

(75) Inventor: Motoshi Kurushima, Chiba (JP)

(73) Assignee: JFE Steel Corporation, Tokyo (JP)

( * ) Notice: Subject to any disclaimer, the term of this patent is extended or adjusted under 35 U.S.C. 154(b) by 1316 days.

(21) Appl. No.: 10/587,943

(22) PCT Filed: Jan. 27, 2005

(86) PCT No.: PCT/JP2005/001553
§ 371 (c)(1),
(2), (4) Date: Aug. 9, 2006

(87) PCT Pub. No.: WO2005/076177
PCT Pub. Date: Aug. 18, 2005

(65) Prior Publication Data
US 2007/0083436 A1 Apr. 12, 2007

(30) Foreign Application Priority Data

Feb. 9, 2004 (JP) .................................. 2004-031845

(51) Int. Cl.
*G06Q 10/00* (2006.01)
(52) U.S. Cl. ........................................................ 705/28
(58) Field of Classification Search .................. 705/28
See application file for complete search history.

(56) References Cited

U.S. PATENT DOCUMENTS 7,409,365 B1 * 8/2008 Hood .............................. 705/35
7,587,356 B2 * 9/2009 West et al. ...................... 705/37

(Continued)

FOREIGN PATENT DOCUMENTS

JP A 09-305663 11/1997

(Continued)

OTHER PUBLICATIONS

Business Wire. "Energy Transfer Partners, L.P. Reports Record Fiscal Year 2005 Results," Nov. 14, 2005.*
Tomohisa Takei, "Cost Sakugen no Machigai O Tadasu", Nikkei Digital Engineering, Oct. 15, 2003, No. 71, pp. 68 to 83.
Hajime Aoyama, "Computer & Network Seisan Kanri System no Susumekata", 1st Edition, Nov. 30, 2000.

*Primary Examiner* — Matthew S Gart
*Assistant Examiner* — Oluseye Iwarere
(74) *Attorney, Agent, or Firm* — Oliff & Berridge, PLC

(57) ABSTRACT

Even in the case of a material producing company that uses common main starting materials and has in-house organizations corresponding to manufacturing processes, appropriate profit-and-loss management by each commercial product type can be realized. A solving method includes: a profit-and-loss storing step of linking at least product type information and profit information to each other by each order of products with order record to be stored in an order record profit-and-loss database; an information search step of accepting specific information on the virtual inter-organ organization and search condition information at least including product type condition, and reading from the order record profit-and-loss database, at least product type information and profit information on an order matching the search condition information and on an order belonging to the virtual inter-organ organization matching the specific information on the virtual inter-organ organization; a profit information aggregating step of sorting the product type information by each product type of a product type classification scale indicated in the product type condition and aggregating profit information corresponding to respective product information sorted by each product type; and a profit-and-loss management information presentation step of presenting the aggregated profit information by each product type as the profit-and-loss management information.

20 Claims, 17 Drawing Sheets

U.S. PATENT DOCUMENTS

| | | | |
|---|---|---|---|
| 2002/0082852 A1* | 6/2002 | Greene et al. | 705/1 |
| 2002/0099640 A1* | 7/2002 | Lange | 705/37 |
| 2002/0169693 A1 | 11/2002 | Kojima et al. | |
| 2003/0009419 A1* | 1/2003 | Chavez et al. | 705/38 |
| 2004/0034558 A1* | 2/2004 | Eskandari | 705/10 |
| 2004/0117325 A1* | 6/2004 | Cash et al. | 705/401 |

FOREIGN PATENT DOCUMENTS

| | | |
|---|---|---|
| JP | A 2003-016255 | 1/2003 |
| JP | A 2003-223543 | 8/2003 |

* cited by examiner

FIG. 11

(A) EXPENSE ITEM UNIT COST TABLE

| MANUFACTURING PROCESS | EXPENSE ITEM GROUP | | UNIT COST | REFERENCE TABLE NAME |
|---|---|---|---|---|
| HOT ROLLING | MAIN RAW MATERIAL | | SLAB UNIT COST | HOT ROLLING YIELD |
| | BY-PRODUCTS | SCRAP | XX,XXX YEN/t | SCRAP FROM HOT ROLLING |
| | FUEL | | X YEN/Mcal | FUEL FOR HOT ROLLING |
| | ELECTRICITY | | X YEN/kwh | ELECTRICITY FOR HOT ROLLING |
| SKIN PASS | MAIN RAW MATERIAL | | HOT ROLLING UNIT COST | SKIN PASS YIELD |
| | BY-PRODUCTS | SCRAP | XX,XXX YEN/t | SCRAP FROM SKIN PASS |
| PICKLING | MAIN RAW MATERIAL | | SKIN PASS UNIT COST | PICKLING YIELD |
| | BY-PRODUCTS | SCRAP | XX,XXX YEN/t | SCRAP FROM PICKLING |
| COLD ROLLING | MAIN RAW MATERIAL | | PICKLING UNIT COST | COLD ROLLING YIELD |
| | BY-PRODUCTS | SCRAP | XX,XXX YEN/t | SCRAP FROM COLD ROLLING |
| | ELECTRICITY | | XX YEN/kwh | ELECTRICITY FOR COLD ROLLING |

(B) COST CALCULATION SPECIFICATION TABLE

| TABLE NAME | CONDITION 1 | CONDITION 2 | ... | SPECIFICATION | OPERATOR | NEXT REFERENCE TABLE |
|---|---|---|---|---|---|---|
| HOT ROLLING YIELD | PLATE THICKNESS XX mm | STEEL TYPE XX | | XX.X | | HOT ROLLING (ELECTRICAL STEEL) |
| | | ... | | XX.X | | HOT ROLLING (PRIMARY) |
| HOT ROLLING (ELECTRICAL STEEL) | | | | | | |
| HOT ROLLING (PRIMARY) | | | | | | |
| HOT ROLLING (OVER ROLL) | | | | | | |
| HOT ROLLING (SECONDARY) | | | | | | |
| SCRAP FROM HOT ROLLING | | | | | | |

FIG. 17

SEARCH RESULT DISPLAY SCREEN — 82a

SEARCH RESULT

| CUSTOMER | SALES PRODUCT TYPE | UNIT PRICE | WEIGHT | MARGINAL PROFIT | ORDINARY PROFIT | MARGINAL COST |
|---|---|---|---|---|---|---|
| A | COLD ROLLING ANNEALING | XX | ... | | | |
| A | GALVANIZED | XX | ... | | | |
| A | ELECTRICAL GALVANIZED | | | | | |
| B | COLD ROLLING ANNEALING | | | | | |
| B | GALVANIZED | | | | | |
| C | GALVANIZED | | | | | |
| C | ELECTRICAL GALVANIZED | | | | | |
| D | ... | | | | | |

SAVE DATA — 82c
PRINT — 82b
BACK TO SEARCH
EXIT

82

PROFIT-AND-LOSS MANAGEMENT INFORMATION PRESENTATION METHOD, PROFIT-AND-LOSS MANAGEMENT INFORMATION PRESENTATION DEVICE, AND PROFIT-AND LOSS MANAGEMENT INFORMATION PRESENTATION PROCESS PROGRAM

TECHNICAL FIELD

The present invention relates to a technical field including a method and device for presenting profit-and-loss management information such as marginal profit and ordinary profit in a material producing company.

BACKGROUND ART

In a material producing company (for example, a steel manufacturer), a given process is performed on a common starting material, and then various basic materials are produced out of the processed raw material in many cases.

FIG. 1 is a diagram showing a relation among costs, a sales structure, and corresponding departments in a steel manufacturer (iron and steel industry). As shown in FIG. 1, in the case of the steel manufacturer, first of all, pig iron is produced from iron ore and coal as main starting materials, and steel is subsequently produced. By performing various processes on the steel, hot-rolled steel products, cold-rolled steel products, surface-treated steel products, electrical steel, steel plate, steel pipe, and further, shaped steel etc., are produced. Due to such a production form, organization in the company includes an ironmaking department, a steelmaking department, a hot rolling department, a cold rolling department, a coated products department, an electrical steel department, a plate rolling department, a pipe department, and further, a shape rolling department, etc., corresponding to manufacturing equipment and manufacturing processes.

This organization form is convenient for manufacturing management, but the organization is not necessarily appropriate to costs management and sales management by each steel product type. That is, in an ironmaking and a steelmaking process, which are common processes, only costs are generated, but in a subsequent hot rolling process, etc., sales for hot-rolled steel and the like as well as costs for the hot rolling process are generated. Furthermore, in view of consideration on total manufacturing costs for each product, the costs for the previous processes should be sorted to be accumulated. For example, in the production of coated products, partial costs for the ironmaking process, the steelmaking process, the hot rolling process, and the cold rolling process and costs for a surface processing process are involved.

For example, Japanese Unexamined Patent Application Publication No. 09-305663 discloses a profit planning calculation method with which in such a steel manufacturer, irrespective of increase in product classification or complexity in marketing route from manufacturing to sales, in addition to forecast on profits obtained from product manufacturing and sales, improvement study for enlarging the profit can be more easily performed.

To the contrary, in a company of a product conclusive type (for example, an electronics manufacturer), starting materials differ on each product, so it is possible to divide a flow from the starting materials to the final product by each product. FIG. 2 is a diagram showing a relation among costs, a sales structure, and corresponding departments in an electronics manufacturer. As shown in FIG. 2, in the case of the electronics manufacturer, it is possible to adopt a profit center approach in terms of appropriate product grouping, and by using such a organization form, profit-and-loss management can be performed by each product type.

DISCLOSURE OF THE INVENTION

Problems in a material producing company of a common starting material type will be further examined while a steel manufacturer is taken as an example.

In the steel manufacturer, to give study on about revenue management and business management, steelworks (about two to six steelworks in average in Japanese blast furnace based integrated steel manufacturers), such aspects including sales and marketing and product types need to be considered.

Each of the steelworks generally includes all the above-mentioned processes (equipment) such as steelmaking, etc and makes efforts to reduce the total costs in the steelworks. Meanwhile, the sales and marketing makes efforts for profit improvement while focusing on selling prices, but a sales and marketing organization itself does not necessarily match a product type. Firstly, sales and marketing organizations for domestic markets and for exports are separated from each other. Also, a sales and marketing representative needs to deal with customers who use various product types.

That is, in a profit-and-loss management framework in the conventional steel manufacturer, there is no organization for specifically performing profit-and-loss management by each product type. Also, the steelworks and the sales and marketing perform tentative profit-and-loss management in terms of the product type, but each of them focuses on viewpoints of cost management, prices, and quantity management, so it is difficult to perform comprehensive profit-and-loss management. Furthermore, the both are different organizations, so profit-and-loss management responsibility for each product tends to be unclear.

Conventionally, in each steel manufacturer as well, profit planning calculation (Patent Document 1 mentioned above) and a computer system for the profit-and-loss management are structured to perform a profit-and-loss management process and cost accounting. Profit-and-loss management information from such a system is presented to the steelworks and the sales and marketing, but due to the above-mentioned reasons it could hardly be mentioned that sufficient profit-and-loss management is conducted.

The present invention has been made in view of the above-mentioned circumstances, and an object of the present invention is to provide a profit-and-loss management information presentation method, a profit-and-loss management information presentation device, and a profit-and-loss management information presentation process program, with which even in a material producing company having company organizations that use common main starting materials and include in-house organizations corresponding to the manufacturing processes, profit-and-loss management information is presented to realize appropriate profit-and-loss management by each product type.

In order to solve the above-mentioned problems, the following invention will be disclosed.

(1) A profit-and-loss management information presentation method of presenting profit-and-loss management information used for profit-and-loss management in a material producing company that uses common main starting materials and produces various basic materials as products and that includes both a productive section and a sales section and is a virtual inter-organ organization (hereinafter, such organization is also referred as 'sector') for performing profit-and-loss management for the products by each product type, including: a profit-and-loss storing step of linking at least product type information and profit information to each other by each order of products with order record to be stored in an order record profit-and-loss database; an information search step of accepting specific information on the virtual inter-organ organization and search condition information at least including product type condition, and reading from the order record profit-and-loss database, at least product type information and profit information on an order matching the search condition information and on an order belonging to the virtual inter-organ organization matching the specific information on the virtual inter-organ organization; a profit information aggregating step of sorting the product type information by each product type of a product type classification scale indicated in the product type condition and aggregating profit information corresponding to respective product information sorted by each product type; and a profit-and-loss management information presentation step of presenting the aggregated profit information by each product type as the profit-and-loss management information, characterized in the respective steps are executed by a computers.

According to this invention, the profit information by each product type is given to such an organization, the actual manufacturing organization needs to be set by each manufacturing process, and even in the material producing company using the same main starting materials, it is possible to perform the profit-and-loss improvement activity with the manufacturing department and the sales and marketing department in an integrated manner. In particular, the manufacturing side can contribute while focusing on the cost reduction related to a commercial product type, and the sales and marketing side can contribute while focusing on the pricing improvement or the like. Also, as a sector is an inter-organ organization in view of the product type and if there are plural steelworks, a sector strides across all of them, it is possible to take measures such as switching the manufacturing places for a product type with an unsatisfactory profit-and-loss.

(2) The profit-and-loss management information presentation method according to (1), characterized in that the profit-and-loss storing step includes linking the product type information and the profit information to customer information by each product order to be stored in the order record profit-and-loss database, the information searching step includes reading the customer information of the order together with the product type information and the profit information, the profit information aggregating step includes sorting the product type information by each product type of a product type classification scale indicated in the product type condition and further sorting the product type information by each customer indicated in the customer information and aggregating profit information corresponding to each product type information sorted by each product type and each customer, and the profit-and-loss management information presentation step includes presenting the aggregated profit information by each product type and each customer as the profit-and-loss management information.

According to this invention, as the profit information by each customer and each product type is given to such an organization, the actual manufacturing organization needs to be set by each manufacturing process, and even in the material producing company using the same main starting materials, it is possible to easily perform the profit-and-loss improvement activity with the manufacturing department and the sales and marketing department in an integrated manner.

(3) The profit-and-loss management information presentation method according to (1) or (2), characterized by further including a profit rearranging step of rearranging the profit information aggregated in the profit information aggregating step in a profit ascending order, characterized in that the profit-and-loss management information presentation step further includes presenting the profit information in an order from the smallest profit to a predetermined rank as the profit-and-loss management information.

Thus, it is possible to easily clarify product types in an unsatisfactory profit-and-loss status, whereby the profit-and-loss improvement actions can be studied on their product types with focus.

(4) The profit-and-loss management information presentation method according to any one of (1) to (3), characterized in that the profit-and-loss storing step includes grouping a plurality of minimum product classification units of the individual specification size corresponding to the order, and further, linking to the order a product type code representing a product type grouped so as not to be treated by the plurality of virtual inter-organ organization and storing the product type code in the order record profit-and-loss database, and the information searching step includes obtaining the product type code with reference to a table representing a corresponding relation with the virtual inter-organ organization and a product type code corresponding to specific information on the virtual inter-organ organization and reading at least product type information and profit information of an order corresponding to the product type code from the order record profit-and-loss database.

Thus, by using such a product type code, it is possible to easily execute the profit-and-loss management by each sector product type.

(5) The profit-and-loss management information presentation method according to (4), characterized in that the product type code is obtained by grouping a plurality of minimum product classification units of the individual specification size so as not to be treated by the plural virtual inter-organ organizations, and further, the product type code is a sales product type code including: a common product code representing the common product type including an information item related to sales management; and a cost management classification code including an information item where a cost difference is occurred, and the profit information aggregating step includes when the product type classification scale indicated in the product type condition corresponds to the common product type, using the common product type code corresponding to each order to perform sorting by each product type, and when the product type classification scale indicated in the product type condition corresponds to the sales product type indicated in the sales product type code, using a sales product type code corresponding to each order to perform sorting by each product type.

Thus, the sales product type code includes the common product type code mainly corresponding to the activity of the sales section added with the cost management classification code suited to the cost management of the productive section. If the profit-and-loss information is managed with the code having such a data structure, the activities common in the sales section and the productive section are facilitated.

(6) The profit-and-loss management information presentation method according (4) or (5), characterized by further including: a cost accounting step of performing cost accounting by each product type of the product type classification scale indicated in the product type code; an individual order profit-and-loss calculation step of calculating costs, sales, and profit by each order of a product with an order record; and an account information output step of outputting costs by each product type corresponding to the product type code calculated in the cost accounting step, as account information used for business accounting of the material producing company, characterized in that the profit-and-loss storing step includes storing the profit by each order calculated in the individual order profit-and-loss calculation step in the order record profit-and-loss database as the profit information.

Thus, a material producing company using the common main starting materials, in particular, in a blast furnace based integrated steel manufacturer, the number of minimum product classification units is enormous. The cost accounting is more efficiently performed while the units are grouped to a certain extent. However, if the minimum product classification units are grouped to perform the profit-and-loss management, it is difficult to perform the profit-and-loss management by each customer and by each product type. Therefore, according to the present invention, the cost accounting is performed for the business accounting in the unit of the individual sales product type or the individual product type of the product type classification scale indicated in the product type code, and in addition to this, there is provided a scheme for executing the profit-and-loss management by each customer and by each product type in the sector. As a result, while the profit-and-loss management by each customer and by each product type on the premise of the sector institution is performed, it is possible to efficiently perform the cost accounting for the business accounting.

(7) The profit-and-loss management information presentation method according to (4), characterized in that the product type code is obtained by grouping a plurality of minimum product classification units of the individual specification size so as not be treated by the plural virtual inter-organ organizations, and further, the product type code includes the common product type code representing the common product type including an information item related to sales management and a cost management classification code including an information item where a cost difference is occurred, with respect to the sales plan information drafted by the common product type unit, by each common product type, from the sales plan information database where the common product type code is assigned for storage, the sales plan information is read in response to a read request for the production plan draft, and on the basis of the sales plan information, each common product type is developed into the sales product type to be output in the sales plan information output step, the production plan information drafted by the sales product type classification is obtained together with raw material costs and department expenses corresponding to the production plan information in the production plan information obtaining step, on the basis of the obtained production plan information, cost accounting is performed by each sales product type in the cost accounting step, costs, sales, and profit by each order of a product with an order record are calculated in the individual order profit-and-loss calculation step, the costs by each product type corresponding to the product type code calculated in the cost accounting step are output to be used for business accounting of the material producing company as account information in the account information output step, and the profit by each order calculated in the individual order profit-and-loss calculation step is stored as the profit information in the order record profit-and-loss database in the profit-and-loss storing step.

Thus, by performing the information management while using the sales product type code, it is possible to perform the unified profit plan drafting and the profit-and-loss improvement activity can be performed with the sales section, the productive section, and the account section being under the sector which is a virtual and inter-organ organization.

(8) The profit-and-loss management information presentation method according to (7), characterized by further including a profit planning value calculation step of calculating a profit plan value by each sales product type or a profit plan value by each common product type calculated from the plan value on the basis of the costs by each sales product type calculated in the cost accounting step and sales information by each sales product type included in the sales plan information drafted in the sales product type classification.

(9) The profit-and-loss management information presentation method according to any one of (6) to (8), characterized in that the individual order profit-and-loss calculation step obtains parts of order information and manufacturing specification information by each order, identifying on the basis of the part of the manufacturing specification information, at least a semi-finished product such as a slab or a billet that should be used and a manufacturing process that should be passed by each order, inputting costs of the semi-finished product calculated in the cost accounting step, adding to the costs, expenses generated in the respective passing steps for the product related to the order to calculate costs by each order, and calculating profit by each order on the basis of sales included in order entry information of the order and costs by each order calculated in the individual order profit-and-loss calculation step.

Thus, with effective use of the semi-finished product cost of the sales product type and also even with consideration to the respective passing processes, it is possible to calculate the costs by each order efficiently with high precision. In the individual order cost calculation, as the individual order cost is calculated from a part of information of the manufacturing specification related to the cost, the calculation load can be lightened.

(10) The profit-and-loss management information presentation method according to any one of (5) to (9), characterized by further including: a common product type determining step of obtaining order entry information of the order, extracting an information item related to sales management from the order entry information, referring to a table representing a corresponding relation between the information item related to the sales management and a common product type code, and determining the common product type code corresponding to the extracted information item; a manufacturing specification determining step of obtaining order entry information of the order, extracting an information item related to product manufacturing from the order entry information, referring to a table representing a corresponding relation between the information item related to the product manufacturing and a manufacturing specification information, and determining the manufacturing specification information corresponding to the extracted information item; a cost management classification determining step of extracting an information item where a cost difference is occurred from the determined manufacturing specification information, referring to a table representing a corresponding relation between the information item where the cost difference is occurred and a cost management classification code, determining the cost management classification code corresponding to the extracted information item; and a sales product type determining step of determining a sales product type code on the basis of the determined common product type code and the cost management classification code.

Thus, the sales product type code can be automatically generated.

(11) A profit-and-loss management information presentation method of presenting profit-and-loss management information used for profit-and-loss management in a material producing company that uses common main starting materials and produces various basic materials as products and that includes both a productive section and a sales section and is a virtual inter-organ organization for performing profit-and-loss management for the products by each product type, including: a profit-and-loss storing step of linking at least product type information and profit information to each other by each order of products with order record to be stored in an order record profit-and-loss database; an information search step of accepting specific information on the virtual inter-organ organization and search condition information at least including product type condition, and reading from the order record profit-and-loss database, at least product type information and profit information on an order matching the search condition information and on an order belonging to the virtual inter-organ organization matching the specific information on the virtual inter-organ organization; and a profit-and-loss management information presentation step of presenting the read profit information by each product type of the product type classification scale indicated in the product type condition as the profit-and-loss management information used for studying a profit-and-loss improvement plan of the commercial product type in the virtual inter-organ organization, characterized in that the respective steps are executed by a computer.

(12) A profit-and-loss management information processing program characterized by causing a computer to execute the respective steps in the profit-and-loss management information presentation method according to any one of (1) to (11).

(13) A profit-and-loss management information presentation device for presenting profit-and-loss management information used for profit-and-loss management in a material producing company that uses common main starting materials and produces various basic materials as products and that includes both a productive section and a sales section and is a virtual inter-organ organization for performing profit-and-loss management for the products by each product type, characterized by including: profit-and-loss storing means for linking at least product type information and profit information to each other by each order of products with order record to be stored in an order record profit-and-loss database; information search means for accepting specific information on the virtual inter-organ organization and search condition information at least including product type condition, and reading from the order record profit-and-loss database, at least product type information and profit information on an order matching the search condition information and on an order belonging to the virtual inter-organ organization matching the specific information on the virtual inter-organ organization; profit information aggregating means for sorting the product type information by each product type of a product type classification scale indicated in the product type condition and aggregating profit information corresponding to respective product information sorted by each product type; and profit-and-loss management information presentation means for presenting the aggregated profit information by each product type as the profit-and-loss management information.

(14) The profit-and-loss management information presentation device according to (13), characterized in that the profit-and-loss storing means links the product type information and the profit information to customer information by each product order to be stored in the order record profit-and-loss database, the information searching means reads the customer information of the order together with the product type information and the profit information, the profit information aggregating means sorts the product type information by each product type of a product type classification scale indicated in the product type condition and further sorting the product type information by each customer indicated in the customer information and aggregating profit information corresponding to each product type information sorted by each product type and each customer, and the profit-and-loss management information presentation means presents the aggregated profit information by each product type and each customer as the profit-and-loss management information.

(15) The profit-and-loss management information presentation device according to (13) or (14), characterized by further including profit rearranging means for rearranging the profit information aggregated by the profit information aggregating means in a profit ascending order, characterized in that the profit-and-loss management information presentation means further presents the profit information in an order from the smallest profit to a predetermined rank as the profit-and-loss management information.

(16) The profit-and-loss management information presentation device according to any one of (13) to (15), characterized in that the profit-and-loss storing means groups a plurality of minimum product classification units of the individual specification size corresponding to the order, and further, links to a product type code representing a product type grouped so as not to be treated by the plurality of virtual inter-organ organization and stores the product type code in the order record profit-and-loss database, and the information searching means obtains the product type code corresponding to specific information on the virtual inter-organ organization, with reference to a table representing a corresponding relation between the product type code and the virtual inter-organ organization. and reads at least product type information and profit information of an order corresponding to the product type code from the order record profit-and-loss database.

(17) The profit-and-loss management information presentation device according to (16), characterized by further including: cost accounting means for performing cost accounting by each product type of the product type classification scale indicated in the product type code; individual order profit-and-loss calculation means for calculating costs, sales, and profit by each order of a product with an order record; and account information output means for outputting costs by each product type corresponding to the product type code calculated by the cost accounting means, as account information used for business accounting of the material producing company, characterized in that the profit-and-loss storing means stores the profit by each order calculated by the individual order profit-and-loss calculation means in the order record profit-and-loss database as the profit information.

(18) The profit-and-loss management information presentation device according to (16), characterized in that the product type code is obtained by grouping a plurality of minimum product classification units of the individual specification size so as not be treated by the plural virtual inter-organ organizations, and further, the product type code includes the common product type code representing the common product type including an information item related to sales management and a cost management classification code including an information item where a cost difference is occurred, with respect to the sales plan information drafted by the common product type unit, by each common product type, from the sales plan information database where the common product type code is assigned for storage, the sales plan information is read in response to a read request for the production plan draft, and on the basis of the sales plan information, each common product type is developed into the sales product type to be output by the sales plan information output means, the production plan information drafted by the sales product type classification is obtained together with raw material costs and department expenses corresponding to the production plan information by the production plan information obtaining means, on the basis of the obtained production plan information, cost accounting is performed by each sales product type by the cost accounting means, costs, sales, and profit by each order of a product with an order record are calculated in the individual order profit-and-loss calculation the, the costs by each product type corresponding to the product type code calculated by the cost accounting means are output to be used for business accounting of the material producing company as account information by the account information output means, and the profit by each order calculated by the individual order profit-and-loss calculation means is stored as the profit information in the order record profit-and-loss database by the profit-and-loss storing means.

(19) The profit-and-loss management information presentation device according to (18), characterized by further including: common product type determining means for obtaining order entry information of the order, extracting an information item related to sales management from the order entry information, referring to a table representing a corresponding relation between the information item related to the sales management and a common product type code, and determining the common product type code corresponding to the extracted information item; manufacturing specification determining means for obtaining order entry information of the order, extracting an information item related to product manufacturing from the order entry information, referring to a table representing a corresponding relation between the information item related to the product manufacturing and a manufacturing specification information, and determining the manufacturing specification information corresponding to the extracted information item; cost management classification determining means for extracting an information item where a cost difference is occurred from the determined manufacturing specification information, referring to a table representing a corresponding relation between the information item where the cost difference is occurred and a cost management classification code, determining the cost management classification code corresponding to the extracted information item; and sales product type determining means for determining a sales product type code on the basis of the determined common product type code and the cost management classification code.

According to the present invention, such a structure is adopted that a sector is provided which is an inter-organ and virtual organization from the productive section to the sales section and also has a responsibility for the individual product type profit-and-loss management, and profit-and-loss management information at least by each product type is presented for the sector, whereby for a product type with an unsatisfactory profit-and loss, the respective departments related to the product type can make actions in an integrated manner.

BRIEF DESCRIPTION OF THE DRAWINGS

FIG. 11(A) shows an example of an expense item unit price table, and FIG. 11(B) shows an example of a cost calculation specification table.

FIG. 17 shows a search result display screen example displayed on a display component of the profit-and-loss management information output device 7.

REFERENCE NUMERALS

Figure 1:
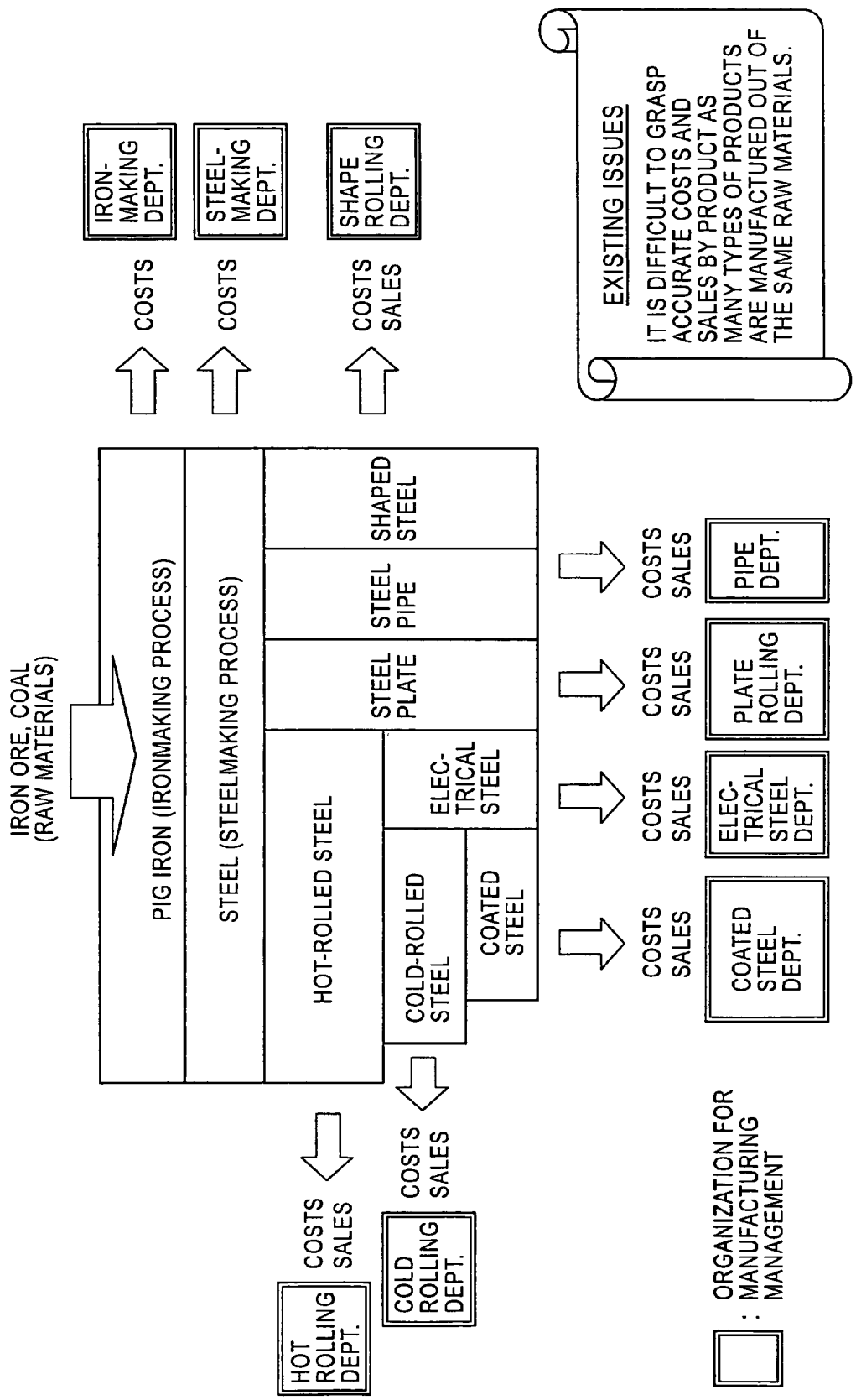
FIG. 1 is a diagram showing a relation among costs, a sales structure, and corresponding departments a steel manufacturer (iron and steel industry).
Figure 2:
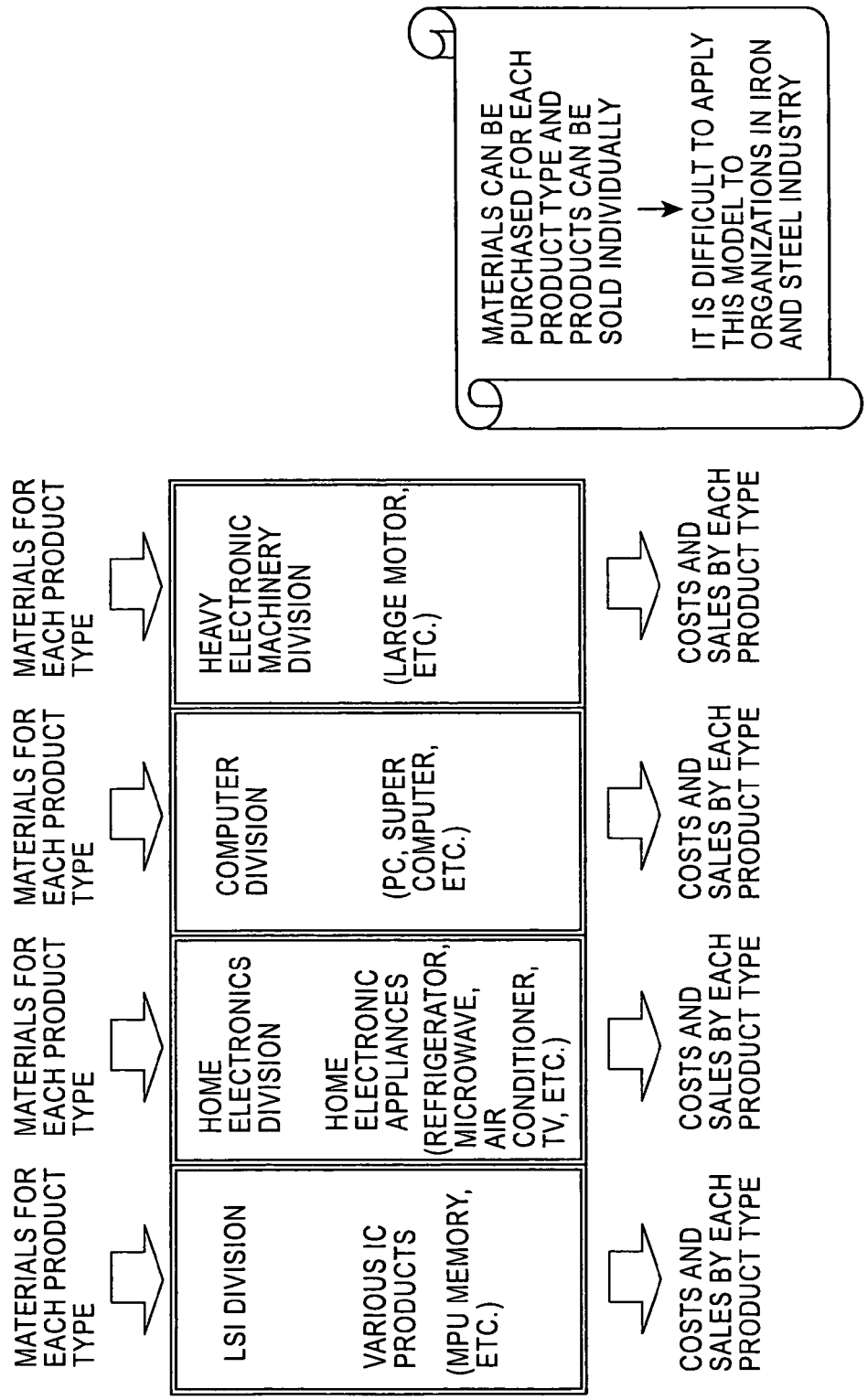
FIG. 2 is a diagram showing a relation among costs, a sales structure, and corresponding departments in an electronics manufacturer.

Reference numerals used in FIGS. 3 to 15 will be described as follows.

1: order entry device, 2: order record management device, 3: specification determining device, 4: logistics cost calculation device, 5: sales/manufacturing planning device, 6: profit-and-loss management device, 7: profit-and-loss management information output device, 8: network, 11: order number issuing component, 12: common product type code determining component, 21: order record management component, 22: order record database, 31: manufacturing specification determining component, 32: cost management classification code determining component, 33: sales product type code determining component, 61: sales product profit-and-loss management component, 61a: profit-and-loss management component, 61*b*: cost calculation component, 61*c*: profit-and-loss management database, 62: individual profit margin management component, 62*a*: individual order cost calculation component, 62*b*: information search and process component, 62*c*: the order record profit-and-loss database, and S: integrated management system.

BEST MODE FOR CARRYING OUT THE INVENTION

The inventor of the present invention have conceived an idea of setting up a sector as an inter-organ organization for performing individual product type profit-and-loss management, and to appropriately provide profit-and-loss management information to this sector, the conventional system for performing the profit-and-loss management or the like is improved, thereby completing the present invention.

Hereinafter, best mode of the present invention will be described with reference to the drawings. It should be noted that according to embodiments to be described below, the present invention is applied to an integrated management system for performing product sales and manufacturing planning, order entry, profit-and-loss management, and the like in the steel manufacturer.

Firstly, to facilitate the understanding of the features of the present invention, concepts of a sector institution and product types as premises for the present invention are described, and a structure and a function of the integrated management system will be described below.

1. Sector Institution

First of all, with reference to FIG. 3, a detailed description will be given of the sector institution.

Figure 3:
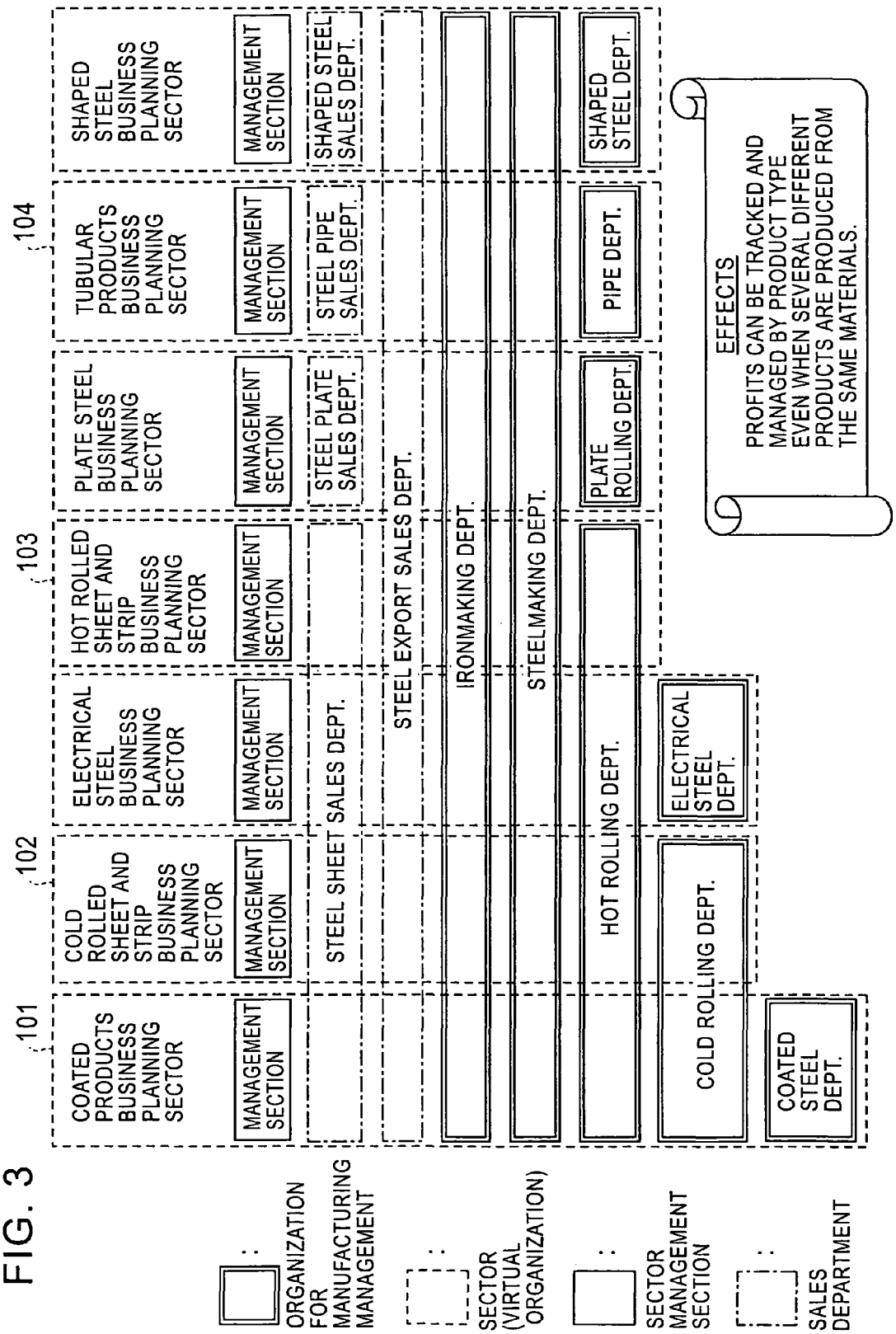
FIG. 3 is a concept diagram showing an example of a sector institution in the steel manufacturer.

FIG. 3 is a conceptual diagram showing one example of the sector institution in the steel manufacturer.

The sector refers to a virtual and inter-organ organization in a material producing company (herein, the steel manufacturer) having common main starting materials and using various basic materials to manufacture products, which includes both the productive section and the sales section and performs profit-and-loss management by each product type for the products. Then, a product type group having a certain commonality is set as a profit-and-loss management target of a particular sector. It should be noted that in the description given below, the commercial product type may be simply referred to as "product type".

As shown in FIG. 3, a sector is set up for each product type group having a certain degree of commonality. For example, in a coated products business planning sector 101, a commercial product type such as a hot-dip galvanized steel sheet or an pickled tin plating steel sheet becomes the profit-and-loss management target. In a tubular products business planning sector 104, a commercial product type such as one of various steel pipes (UOE, ERW, etc) becomes the profit-and-loss management target. It should be noted that the grouping of the sector can be appropriately set. For example, the coated products business planning sector 101, a cold rolled sheet and strip business planning sector 102, and a hot rolled sheet and strip business planning sector 103 can be collectively regarded as a steel sheet business planning sector.

Then, each sector includes all the productive section (manufacturing management organization) and the sales section (sales and marketing organization) related in viewpoint of the commercial product type, and further may include a research and development department (research organization). For example, the coated products business planning sector 101 shown in FIG. 3 includes the coated products department, the cold rolling department, the hot rolling department, the steelmaking department, and the ironmaking department which are necessary for the manufacturing, and further includes a steel sheet sales department for domestic sales and a steel product export sales department for export sales. Also, a production (manufacturing) department for producing a common material such as the ironmaking department and the steelmaking department is also included in another sector for example, the tubular products business planning sector 104. In this sense, the sector is a virtual organization to which necessary manufacturing members and sales and marketing members redundantly belong in view of the commercial product type, and at the same time, an inter-organ organization which strides across actual personnel organizations for manufacturing and sales. A sector management section is provided for smoothly running the sector's overall operation. It should be noted that the sector is beyond the framework of the steelworks and includes corresponding departments in all of the steelworks.

With the provision of such a sector institution, the profit-and-loss management by each product type can be efficiently performed. That is, the sector includes the productive section as well as the sales section in view of the commercial product type, and therefore on the basis of the profit-and-loss management information from the integrated management system, the cost reducing activity and the sales improvement activity regarding the commercial product type can be executed under the sector's responsibility. Furthermore, if the cost focused profit-and-loss management by each steelworks unit is performed along with the sector's activities, the profit improvement activity in the matrix of the manufacturing-commercial product type can be conducted.

2. Commercial Product Type

Subsequently, a commercial product type will be described in detail.

The steel products in the steel manufacturer include an extremely large product types. When the cold-rolled steel is taken as an example, the cold-rolled steel further includes product types such as an annealed cold-rolled strip steel and the pickled cold-rolled strip steel, which are further classified in terms of the ingredients, steel plate characteristics, sizes, manufacturing processes, and the like. In the end, the minimum steel product classification is defined in the form of a classification unit by each specification size (also referred to as an individual specification size unit or minimum product classification unit), which is determined by a product specification corresponding to the order or a specification such as a manufacturing specification and a size of the steel. The number of the classification units by each specification size is as many as several hundred thousand. If the production and sales plans are drafted for that many product types to perform cost accounting and profit-and-loss management, the lead time is prolonged from the plan drafting and record trace to analysis, thereby disturbing the profit improving activity. Also, the calculation amount is huge and the handling is bothersome. Therefore, the management by each product type is performed in a unit obtained by grouping some minimum product classification units for business accounting.

According to this embodiment, to appropriately running the sector institution, this minimum product classification grouping has a feature. It should be noted that in the case of the individual specification size or the minimum product classification unit and the case of the individual order are almost the same, but when there are a plurality of orders of the completely same specification size (repeat orders or the like), the orders are not distinguished in terms of the individual specification size or the minimum product classification unit, but the orders are not distinguished in terms of the individual order.

3. Product Type Code

Subsequently, with reference to FIG. 4, a product type code suited to the sector institution operation will be described in detail.

FIG. 4(A) shows a hierarchical classification example of product types in the sector institution, and FIG. 4(B) shows a classification code data structure example for managing the product types.

In the sector institution, as shown in FIG. 4(A), about several thousands of sales product type units are structured by grouping several hundreds of thousand minimum product classification units, and further several hundreds of common product type units are structured by grouping the sales product type. Also, the respective common product types are structured in such a manner that all of the smaller classification units (the sales product type classification unit and the minimum product classification unit) belong to the same sector.

As a result, the product type management under the sector institution is facilitated. Then, the corresponding relation between the common product type and the sector will be described later.

Then, in order to efficiently execute the commercial product type management covering the sector—the common product type—the sales product type—the minimum product classification unit shown in FIG. 4(A), according to this embodiment, a code referred to as sales product type code shown in FIG. 4(B) is set.

The sales product type code is composed of the common product type part (this part is indicated by a common product code) linked with the common product type, and the cost management classification (this classification is indicated by a cost management classification code.

The common product code is a code that can be generated only by the product order information and has an information item related to sales management (for example, which is useful for the sales management). This information item includes, for example, a large scale product type classification (hot rolling, cold rolling, electrolytic galvanizing, hot dip galvanizing, tin free, laminating, tin, electric, steel plate, shaped steel, spiral, etc.) and product type classification information such as a medium scale product type classification, which is obtained by specifying the large scale product type classification to some extent, and sales management information for the sales section to perform the sales management (application, shape or spec or the like). It should be noted that the product classification information is also the sales management information in a broad meaning.

On the other hand, the cost management classification code is an information item where a cost difference is occurred when the product is manufactured, in other words, one having an information item with a strong cost impact. This information item includes, for example, the steel type, the standard, the sheet thickness, the sheet width, and information on steelworks, manufacturing processes, and the like.

Also, for example, when information on the common product type part (common product code) is the same, depending on a product, the manufacturing costs are varied in some cases when manufactured by ΔΔ facility in ○○ steelworks and when manufactured by ◇ ◇ facility in xx steelworks. In this case, the cost management classification codes are different, so the sales product type codes are different.

It should be noted that which information item is included in the common product type part and which the cost management classification is included are varied depending on a character of the respective products. The information included in the cost management classification in one product may be included in the common product type part in another product (and vice versa).

As described above, the sector institution is the organization institution which groups the productive section and the sales section (and further the research & development section and the like), irrespective of the manufacturing organization or the sales and marketing organization, in view of the individual product type profit-and-loss improvement in an interorgan and virtual way. The productive section and the sales section have different treatment manners even they deal with the same steel product. The sales section has an interest in what and how to sell while mainly meeting the customers needs, and performs the profit-and-loss management in view of the enlargement of sales quantity and the price improvement of the respective products.

On the other hand, the productive section has a main interest in the product yield increase and the specific unit consumption decrease, and performs the profit-and-loss management in view of the efficient operation (in particular, costs) of the responsible facility. The sector institution is an institution for running the productive section, the sales section, and the like in a unified manner, so it is necessary to execute the product type management with the grouping convenient for both the productive section and the sales section (grouping for commonly using the profit margin information), that is, it is necessary to have the product type code information setting.

From this viewpoint, the common product type unit (common product code) is the grouping composed of the sales management information including the product information, which is convenient for drafting the sales plan and the production plan it is convenient at the headquarter management level (the sales section, etc.) to draft sales plan and production plan. The sales product type classification has too many types, which is too detailed to be dealt by the headquarter's sales section.

On the other hand, the sales product type classification (sales product type code) has both the product information of the common product type part and the information for managing the costs of the cost management classification, which is convenient for drafting the production plan at the steelworks with consideration on up to the manufacturing costs. It should be noted that the common product type unit is too rough for the production plan on the manufacturing side.

The introduced sales product type according to this embodiment is grouped by the common product type, which further corresponds to the sector by each common product type. In other words, the sales product type code includes the common product code corresponding to the sector. Therefore, the sales product type code becomes a common language in the sales section, the productive section, etc., that is, across the entire sector. By structuring a revenue management system using such a sales product type code, the profit-and-loss management by the sector can be executed efficiently.

It should be noted that in this specification, when referring as merely the product type (commercial product type), any of the product type classification scales are included at the product type classification scales shown in FIG. 4(A), etc., which are not limited to the product type classification scales. Also, the sector product type or the product type belonging to the sector indicates that how large the product type classification scale of the sector product type itself is, regarding one included in a specific sector product type, all the product types smaller than the product type classification scale are product types belonging to the specific sector. Therefore, in this specification, for example, the common product type and the sales product type are each the sector product type (the sector is identified by the common product code). Also, each of the minimum product classification units is the sector product type, but in this embodiment, by assigning a sales product type code to each order, the identification of the belonging sector is facilitated without checking the order information (the detail will be described later).

By using such a product type code, the individual sector product type profit-and-loss management can be easily executed. In this embodiment, a concept of a sales product type code composed of the common product code and the cost management classification code is introduced. The product type herein may correspond to any of the common product code and the sales product type code, but is not limited to the above. Any of the product type classification scale may be used as long as the grouping so as not to be treated by plural sectors and the corresponding relation with the sector is formed.

4. Sector Institution Corresponding System

Subsequently, with reference to FIG. 5, a sector institution corresponding system using sales product type codes will be described in detail.

Figure 5:
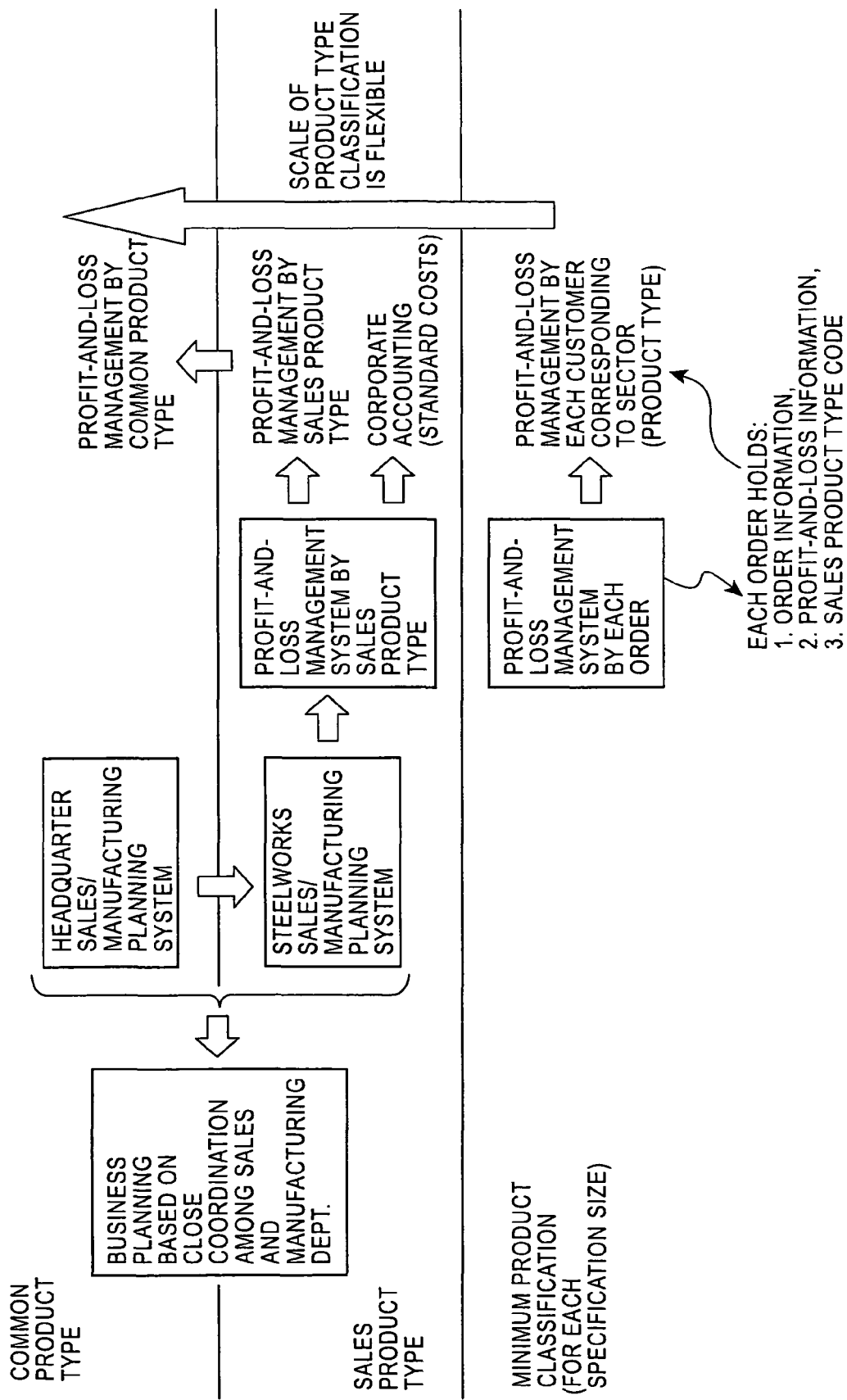
FIG. 5 shows a concept example of a sector institution corresponding system using sales product type codes.

FIG. 5 shows a concept example of the sector institution corresponding system using sales product type codes.

The sales product type code is a common language of the productive section and the sales section which structure the sector. If the production and sales plan drafting system and the profit-and-loss management system for the product are structured by using the sales product type code, for example, a concept shown in FIG. 5 is obtained.

That is, the sales and production system is composed of the headquarter sales and production plan drafting system for the headquarter (the sales section or the like) to draft the production and sales plan at the common product type and the steelworks production and sales plan drafting system for the steelworks to draft the production and sales plan at the sales product type on the basis of the production and sales plan drafted at the common product type.

In the case of the plan drafting at the common product type, the common product code corresponding to each common product type is assigned to the sales plan (information) drafted and generated in the common product type unit, to be input to the headquarter sales and production plan drafting system. Also, in the case of the plan drafting at the sales product type, the common product type is developed into the sales product type for plan generation, and then the sales product type code is assigned to each sales product type in the plan to be input to the steelworks production and sales plan drafting system.

It should be noted that these plan drafting systems are each composed of a computer including an input component for inputting the plan information, etc., a memory component for storing the plan information, etc., and a computation component for executing various programs for supporting the plan drafting, etc.

On the other hand, the profit-and-loss management system includes an individual sales product type profit-and-loss management system at the sales product type level suitable to the standard cost accounting, and uses the output of this system to perform the business accounting and the macro profit-and-loss management. The profit-and-loss management has a form, for example, of a half year profit planning display and the monthly record addition display by each sales product type or the like. In a revenue management display of the sales product type classification, if the product type classification unit is too detailed, data of the individual sales product type profit-and-loss management system may be subjected to calculation for grouping by each common product type, thereby performing the profit-and-loss management of the common product type unit.

The sales product type level system has no information for each order (the customer information, etc.), so the micro profit-and-loss management corresponding to the order information (the customer, etc.) is difficult. Therefore, in the profit-and-loss management system, further, at the minimum product classification unit (the individual specification size) level, the individual order profit-and-loss management system is provided. The sales product type code is assigned to each combination of the order information by each order and the profit-and-loss information in this system. With the assignment of the sales product type code, the profit-and-loss management corresponding to the sector can be easily executed at this level too.

Figure 4:
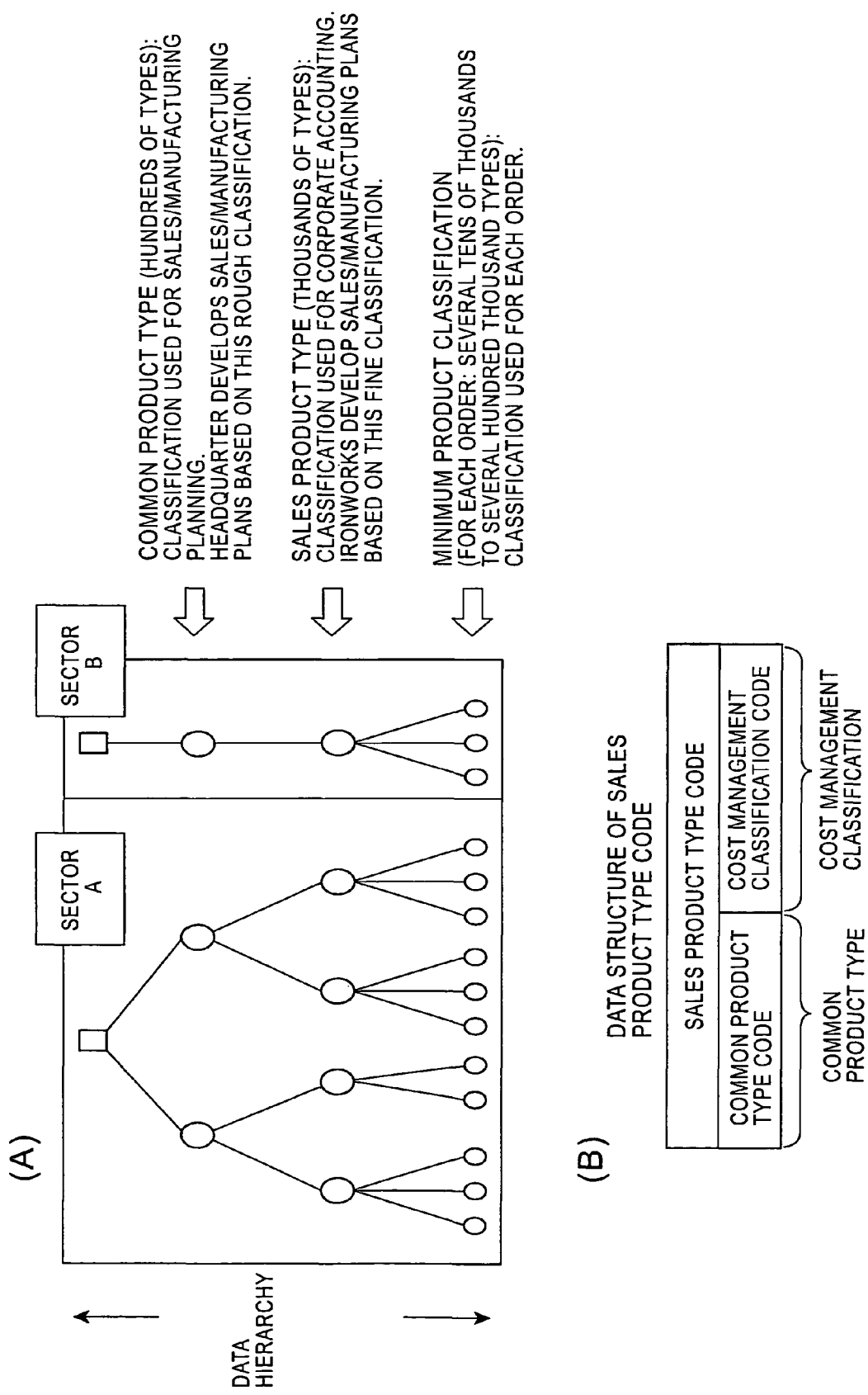
FIG. 4(A) shows a hierarchical classification example of product types in the sector institution.
FIG. 4(B) shows a classification code data structure example for managing the product types.

It should be noted that on the basis of the concept shown in FIG. 4, the system herein is "the individual specification size profit-and-loss management system", but in actual, if the product type classification scale is reduced to this level, "the individual order profit-and-loss management system" is more easily formed, so this is set as "by each order" herein (two orders with completely the same specification size cannot be distinguished in terms of the individual specification size (the minimum product classification unit), but can be distinguished in terms of the individual order).

As the individual order profit-and-loss management system has the order information for each order, it is possible to edit the profit-and-loss information under various meshes (product type classification scales), for example, for each customer, for each steelworks, domestic/export (for each exporting country), etc.

In addition, the product type scale of the profit-and-loss management too, if the minimum product classification unit is too detailed, the sales product type code is used to group into the sales product type or the common product type unit, or by using the order information, a product type level with a predetermined scale can be made as well.

In this embodiment, while focusing the above points, integrated management to be described below is structured.

5. Integrated Management Structure, Function, and Operation

Subsequently, the integrated management structure, function, and operation according to this embodiment will be described in detail.

Figure 6:
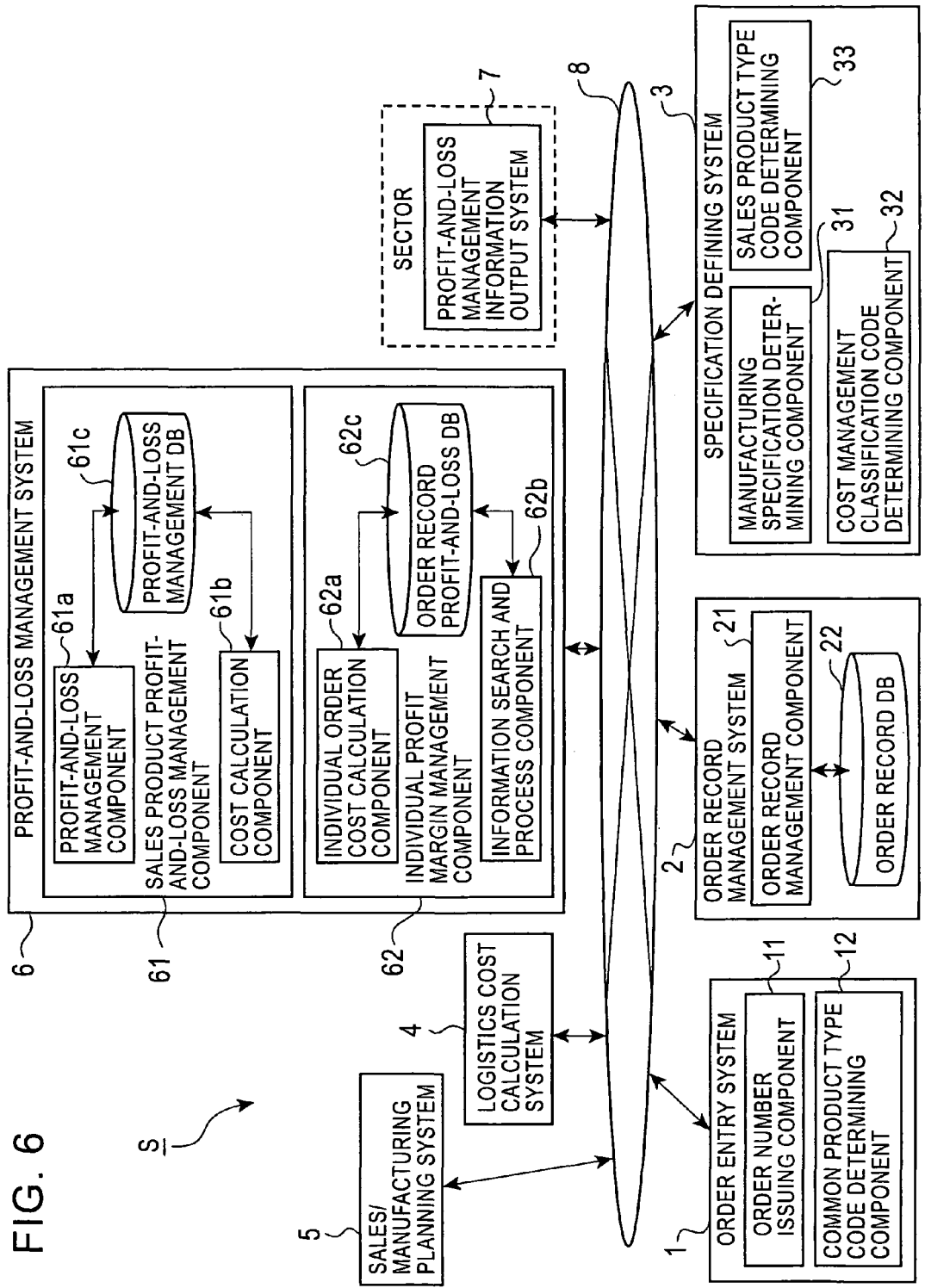
FIG. 6 is a block diagram showing a schematic structure example of the integrated management system.

FIG. 6 is a block diagram showing a schematic structure example of the integrated management.

As shown in FIG. 6, an integrated management S is composed to include an order entry device 1, an order record management device 2, a specification defining device 3, a logistics cost calculation device 4, a sales/production planning device 5, a profit-and-loss management device 6, a profit-and-loss management information output device 7, and the like. The respective devices are mutually connected via a LAN (Local Area Network), a WAN (Wide Area Network), or a network 8 such as an intranet. The profit-and-loss management information output device 7 is provided, for example, to a sector management section or the like for each sector.

It should be noted that the profit-and-loss management device 6, or a combination of the profit-and-loss management device 6 and the profit-and-loss management information output device 7, or a combination of the profit-and-loss management device 6, the order entry device 1, and the specification defining device 3 corresponds to the profit-and-loss management information presentation device of the present invention.

Then, each of the devices 1 to 7 is structured by a computer, which includes a computation component (composed of a CPU, an operation RAM, a ROM, or the like), a memory component for storing various programs, various data, and the like (for example, HDD (Hard Disc Drive) or the like), an operation component for inputting an operation instruction from the user (for example, a keyboard, a mouse, or the like), a display component for displaying an image, a character, and the like (for example, a liquid crystal display or the like), a communication component for controlling communication statuses between the devices via the network 8, etc. Then, in the respective devices 1 to 7, the CPU in the computation component executes the various programs (including a profit-and-loss management information presentation program), whereby the devices 1 to 7 can perform the respective functions.

5.1. Structures, Functions, and Operations of the Order Entry Device 1, the Order Record Management Device 2, and the Specification Defining Device 3

In the above-mentioned structure, first of all, with reference to FIG. 7, the structures and functions of the order entry device 1, the order record management device 2, and the specification defining device 3, and further, generation processes (operations) of the common product code, the cost management classification code, the sales product type code, and the like executed by the devices 1 to 3 will be described in detail.

Figure 7:
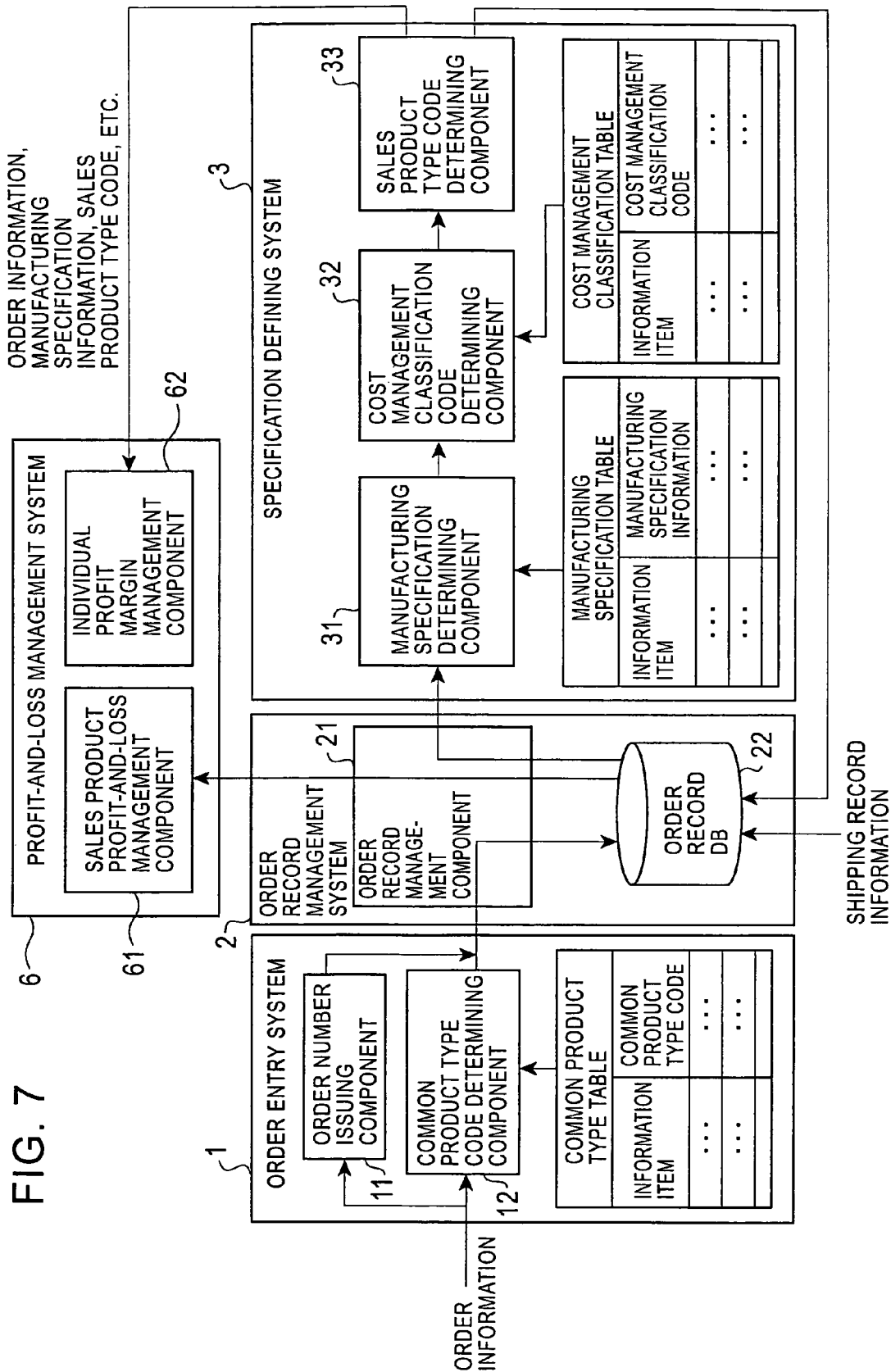
FIG. 7 is a concept diagram showing a flow example of various pieces of information caused when a common product code, a cost management classification code, and a sales product type code are generated.

FIG. 7 is a conceptual diagram showing one flow example of various pieces of information caused when the common product code, the cost management classification code, and the sales product type code are generated.

As shown in FIG. 7, in the order entry device 1, the computation component functions as an order number issuing component 11, a common product type code determining (setting) component 12 as common product type determining means, and the like. the information item related to sales management (for example, the product classification information and the sales management information described above) and a table showing a corresponding relation with the common product code (hereinafter, referred to as "the common product type table") are stored in the memory component. The common product type table is a table where the common product codes are allocated while corresponding to a part or all of the information item of the order information.

Then, the order number issuing component 11 of the order entry device 1 obtains, the order information where, for example, the user (order input operator) operates the operation component to obtain the order information on the input product order, and assigns an order number to the order (for example, a serial number is assigned in the order input sequence). Also, the common product type code determining component 12 of the order entry device 1 extracts from the input order-information, the information item related to sales management, and with reference to the common product type table, the common product code corresponding to the extracted information item is determined (in other words, the common product type code determining component 12 takes out from the order information, the part related to the product information such as the product type information and an item related to the sales management to be collated with the common product type table, thereby determining the common product code). Then, the order entry device 1 outputs the information on the order information, the order number, the common product code, etc. via the network 8 to the order record management device 2. It should be noted that the common product code is not necessarily determined by the common product type code determining component 12, but the code may be included the order information in advance or directly input to the order entry device 1 while the user (code setting operator) operates the operation component.

Herein, the order information includes at least, as the customer information, the customer name, the product type information for specifying the product type of the ordered product, the unit price, quantity, delivery place, delivery date, order date, application, etc.

As examples of the large product type classification are given, firstly, examples of the largest level include the product classifications of steel sheet, steel plate, steel pipe, shaped steel, etc. Subsequently, when the steel sheet is considered, there are product types of the hot-rolled steel, the cold-rolled steel, electric steel, etc. Then, the cold-rolled steel is developed into product types of the further smaller product type classification scale, the annealed cold-rolled material, the pickled cold-rolled material, the hot-dip zinc plated material, the electrolytic zinc plated material, the tin plated material etc. Furthermore, the materials have product types such as strength and deformation characteristic, and the size (thickness, width, length, etc.) is also one of the product types. Also, when the steel product is identified by the JIS standard, etc., this standard information is also one of the product types. The product type includes a part or all of the above-mentioned information in this specification.

Next, in the order record management device 2, the computation component functions as an order record management component 21, etc., and an order record database 22 is structured in the memory component. Then, the order record management component 21 of the order record management device 2 input information such as the order information, the order number, and the common product code from the order entry device 1 to store the information as order record information in the order record database 22 for management. It should be noted that in this stage, the order record database 22 does not store the corresponding cost management classification code, shipping record, etc.

Subsequently, in the specification defining device 3, the computation component functions as a manufacturing specification determining (setting) component 31 as manufacturing specification determining means, a cost management classification code determining (setting) component 32 as the cost management classification determining means, and a sales product type code determining component 33, etc. as the sales product type code generation means. The memory component stores a table showing a corresponding relation between the information item related to the product manufacturing and the manufacturing specification information (hereinafter, referred to as "manufacturing specification table") and a table showing a corresponding relation between the information item where the cost difference is occurred and the cost management classification code (hereinafter, referred to as "cost management classification table"). The cost management classification table is a table in which the cost management classifications are allocated to a part or all of the order information while corresponding to the information item.

Then, the manufacturing specification determining component 31 of the specification defining device 3 obtains (inputs) information on the order such as the order information, the order number, and the common product code via the network 8 from the order record database 22 of the order record management device 2, extracts from the order entry information the information item related to the product manufacturing, and with reference to the manufacturing specification table, determines the manufacturing specification information corresponding to the extracted information item (in other words, the manufacturing specification determining component 31 takes the information item related to the product manufacturing from the order information, collates the information item with the manufacturing specification table to determine the manufacturing specification information). It should be noted that the manufacturing specification information is not necessarily determined by the manufacturing specification determining component 31. For example, one or plural pieces of the manufacturing specification information that may handle on the basis of the order information are displayed and output on the display component of the specification defining device 3, the user (specification setting operator) is allowed to select and input from the operation component to set the manufacturing specification information. In this case, to provide selection options to the user, the manufacturing specification database previously storing the specification data is structured in the memory component.

When the manufacturing specification is determined, the cost management classification code determining (setting) component 32 of the specification defining device 3 extracts the information item where the cost difference is occurred from the determined manufacturing specification information, and with reference to the cost management classification table, the cost management classification code corresponding to the extracted information item is determined (that is, the cost management classification code determining component 32 determines the corresponding cost management classification code while a part or all of the manufacturing specification is collated with the cost management classification table).

In this manner, when the cost management classification code is determined, a sales product type code determining component 33 of the specification defining device 3 generates the sales product type code on the basis of the common product code and the cost management classification code (in other words, the common product code and the cost management classification code are combined to generate the sales product type code). In this way, the sales product type code can be automatically calculated.

Then, the specification defining device 3 returns the generated sales product type code and the order number to the order record management device 2 to be stored in the order record database 22. As a result, in the order record database 22, the combination of the order number, the sales product type code, and the order information is stored and held. Also, the specification defining device 3 stores the order information, the order number, the manufacturing specification information (for example, a part of the information related to the costs necessary to the cost accounting), information on the sales product type code, etc. in the memory component, for example, and outputs the information via the network 8 to the profit-and-loss management device 6 (an individual profit margin management component 62) in response to the request from the profit-and-loss management device 6.

It should be noted that when the product corresponding to the purchased order is shipped, shipping record information linked with the order is stored in the order record database 22. This order with the ship record is the subject of the sales record to be used in the monthly individual sales product type sales calculation, etc. in the profit-and-loss management device 6.

In this way, the sales product type code includes the common product code mainly corresponding to the sales section activity to which the cost management classification code suited to the productive section cost management is given. By managing the profit-and-loss information with the code of this data structure, the activities common in the sales section and the productive section are facilitated. According to this embodiment, the sales product type code is linked to each order to be stored in an order record profit-and-loss database 62c, and together with the customer information of the order record profit-and-loss database 62c, the still more efficient profit-and-loss improvement activities can be performed.

5.2. Structure, Function, and Operation of the Profit-and-Loss Management Device 6

Subsequently, with reference to FIG. 6, the structure and the function of the profit-and-loss management device 6 will be described in detail.

As shown in FIG. 6, the profit-and-loss management device 6 is roughly structured to include a sales product profit-and-loss management component 61 (corresponding to the individual sales product type profit-and-loss management system shown in FIG. 5) for managing the profit-and-loss at the sales product type level by using the sales product type code, and an individual profit margin management component 62 (corresponding to the individual order profit-and-loss management system shown in FIG. 5) for performing the profit-and-loss management by-each order. It should be noted that the sales product profit-and-loss management component 61 and the individual profit margin management component 62 may have separate structures in terms of hardware (in other words, a computer having the sales product profit-and-loss management component 61 and a computer having the individual profit margin management component 62 are provided, and the mutual computers are connected via communication means), or may have separate structures in terms of software (in other words, one computer has the sales product profit-and-loss management component 61 and the individual profit margin management component 62).

Then, in the profit-and-loss management device 6, the computation component functions as the sales product profit-and-loss management component 61 and the individual profit margin management component 62, and further, the sales product profit-and-loss management component 61 functions as a profit-and-loss management component 61a for profit planning value calculation means, and as a cost calculation component 61b for the sales plan information output means, the production plan information obtaining means, cost accounting means, and account information output means. The individual profit margin management component 62 functions as an individual order cost calculation component 62a for individual order profit-and-loss calculation means and also functions as an information search and process component 62b for information search means, profit information aggregating means, profit rearranging means, and profit-and-loss management information presentation means. Also, in the memory component of the profit-and-loss management device 6, a profit-and-loss management database 61c and the order record profit-and-loss database 62c are furnished.

5.2.1. Outline Process of the Sales Product Profit-and-Loss Management Component 61

The profit-and-loss management component 61a of the sales product profit-and-loss management component 61 calculates the profit planning and sales record by the sales product type classification to be stored in the profit-and-loss management database 61c, and performs the profit-and-loss management linked with the sales product type. The cost calculation component 61b calculates the standard costs by the sales product type classification and also calculates a record difference amount, etc. on the basis of the department expense records to be stored in the profit-and-loss management database 61c.

Hereinafter, with reference to FIG. 8, a schematic process of the sales product profit-and-loss management component 61 will be described in detail.

Figure 8:
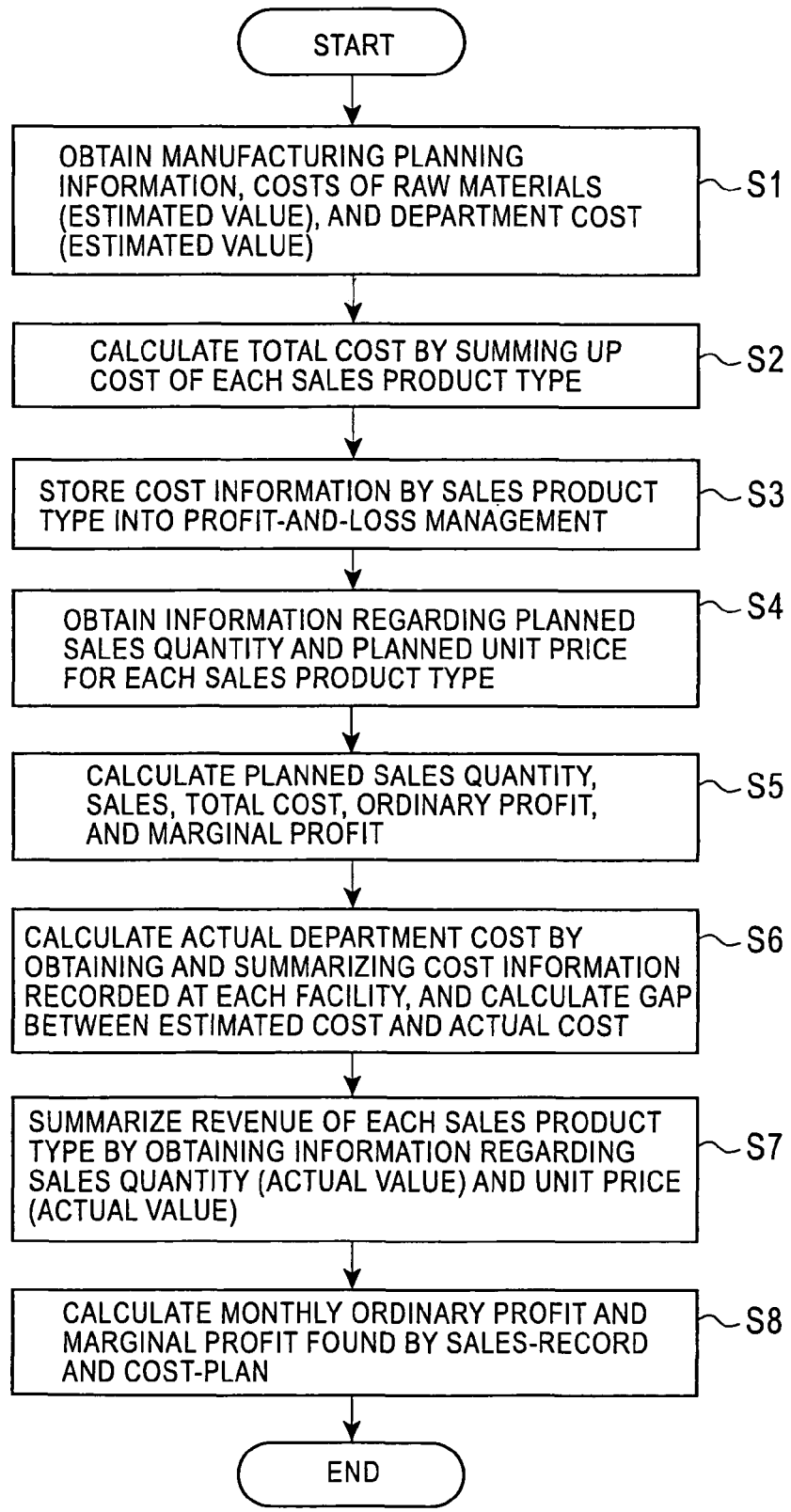
FIG. 8 is a flowchart showing a schematic process example of a sales product profit-and-loss management component 61.

FIG. 8 is a flowchart showing a schematic process example of the sales product profit-and-loss management component 61.

Before a description will be given of this drawing, firstly, data generation of the raw material expense by each sales product type (estimated), the department expense (estimated), the sales quantity (planned), and the unit price (planned) in a sales/manufacturing planning device will be described. It should be noted that a sales/manufacturing planning device 5 corresponds to the headquarter sales and production plan drafting system and the steelworks production and sales plan drafting system in FIG. 5, but herein both the systems are described without giving any particular distinction.

For example, the memory component of the sales/manufacturing planning device 5 has the sales plan information database. Herein, the sales plan information to which the common product code is given by each common product type is stored with respect to the sales plan information drafted by the common product type unit in the sales section. It should be noted that the sales plan information database may be composed of the memory component of the profit-and-loss management device 6.

Then, after the program related to the process is activated in response to the estimated calculation start instruction via the operation component by the user, the user (for example the productive section member and the sales section member) operates the operation component to instruct the reading for the production plan drafting in the productive section. In response to this, the sales/manufacturing planning device 5 reads the sales plan information from the sales plan information database, and on the basis of the sales plan information, the common product type is developed into the sales product type to be displayed on, for example, the display component. It should be noted that the quantity ratio and the corresponding prices when the common product type is developed into the respective sales product types are set in the table in advance on the basis of the past sale record. As a result at the time of the sales product type development, the quantity and price by each sales product type are automatically set.

In this way, on the basis of the information developed into the sales product type and the production plan and the department expense plan at the steelworks, etc., the productive section drafts the production plan information of the sales product type classification. The production plan information, etc. are input by the user (for example, the productive section member) operating the operation component, whereby the raw material costs (estimated) corresponding to the production plan information and the department expense (estimated) are stored in the sales plan information database.

In this way, from the sales/manufacturing planning device 5 storing the costs and the information necessary for the profit-and-loss calculation, the profit-and-loss management component 61a obtains the production plan information together with the corresponding raw material costs (estimated) and the department expense (estimated) (Step S1).

Herein, the production plan information includes, for example, information on which steelworks manufactures for which product quantity by each sales product type, and the raw material expense (estimated) includes, for example, the raw material expense information to be used by each facility in the steelworks. The department expense (estimated) includes, for example, expense information such as service costs and labor costs. It should be noted that a department herein means the ironmaking department, the steelmaking department, and the like, and the department expense (estimated) includes information on all expenses in the respective departments of the steelworks and also information on the expense by each facility belonging to each department.

Next, the cost calculation component 61b calculates cost accumulation by each steelworks by each sales product type on the basis of the obtained production plan information, the raw material expense (estimated), and the department expense (estimated) (Step S2). To be more specific, with the execution of the cost accumulation calculation by each sales product type, first of all, the facility use rate and the raw material use rate by each sales product type are calculated from the entire production plan information. Subsequently, the operation costs by each facility (estimated) and the raw material expense (estimated) are multiplied by the calculated sales product type use (amount) rate to calculate the necessary expense for each facility (step). Then, the costs are all accumulated to calculate the costs for the certain sales product type. Such calculations are performed for all the sales product types, thereby calculating the costs by each sales product type (for example, the standard cost accounting by each sales product type is performed).

Next, the cost calculation component 61b stores the information on costs by the individual sales product type calculated in this way in the profit-and-loss management database 61c (Step S3). Also, the cost calculation component 61b outputs the costs by each sales product type as account information, for example, to be used for the business accounting of the steel manufacturer(to be output on the display component or to another device).

Next, the profit-and-loss management component 61a obtains the sales quantity (planned) and the unit price (planned) by each sales product type, for example, from the sales plan information database in the sales/manufacturing planning device 5 via the network 8 (or the user operates the operation component for input), and further obtains the logistics cost (estimated) and expenses in the headquarter, etc. (the headquarter expense and other incidental costs) (estimated) from the sales plan information database (Step S4).

Next, the profit-and-loss management component 61a reads the information on the costs by each sales product type from the profit-and-loss management database 61c, allocates the obtained logistics cost, the headquarter expense, etc. to the costs by each sales product type to calculate, for example, the planned values of half year quantity, unit price, sales, total cost, marginal cost, ordinary profit, marginal profit, etc., by each sales product type (by each sales product type code) (Step S5), and store the planned values in the profit-and-loss management database 61c.

Next, the cost calculation component 61b obtains, for example, the actual total expense by each facility in each department (each facility, each manufacturing step) which is stored in a predetermined database as the department expense (result) to calculate the amount of difference from the planned value (Step S6). Then the amount of difference is linked with the planned value to be stored in the profit-and-loss management database 61c.

Then, the profit-and-loss management component 61a obtains, for example, on a monthly basis, from the order record database 22 of the order record management device 2, the sales quantity (result) and the unit price (result) via the network 8 to aggregate the quantity, unit price, sales of the sales product type classification (Step S7). The profit-and-loss management component 61a obtains, for example, the logistics expense (result), the headquarter expense (result), etc., stored in a predetermined database, and further, obtains the information on the costs (planned) by each sales product type from the profit-and-loss management database 61c to calculate, for example, the monthly total cost, marginal cost, ordinary profit, marginal profit, etc. based on the sales-record and the cost-plan (Step S8). These pieces of information are then stored in the profit-and-loss management database 61c.

In the material producing company using the common main starting materials, in particular, the blast furnace based integrated steel manufacturer, the number of the minimum product classification units is extremely large. By grouping the units to some extent as in the above-mentioned process, the cost accounting can be more efficiently performed.

5.2.2. Outline Process of the Individual Profit Margin Management Component 62

The individual order cost calculation component 62a of the individual profit margin management component 62 calculates the ordinary profit, the marginal profit, etc. by each order of the product of the order record, and stores the information on the profit information and the product type information, etc. stored in the order information from the specification defining device 3 in the order record profit-and-loss database 62c, the search and process component 62b reads the profit information and the information on the product type information, etc. from the order record profit-and-loss database 62c in response to a request from the profit-and-loss management information output device 7 to sort the product type information by each product type of the product type classification scale indicated in a predetermined product type condition. Then, the profit information corresponding to the product type information sorted by each product type is aggregated to present the profit information by each product type as profit-and-loss management information via the profit-and-loss management information output device 7 to the user (for example, the sector manager).

5.2.2a. Process of the Individual Order Cost Calculation Component 62a

First of all, with reference to FIGS. 9 and 10 and the like, an outline process of the individual order cost calculation component 62a of the individual profit margin management component 62 will be described in detail.

Figure 9:
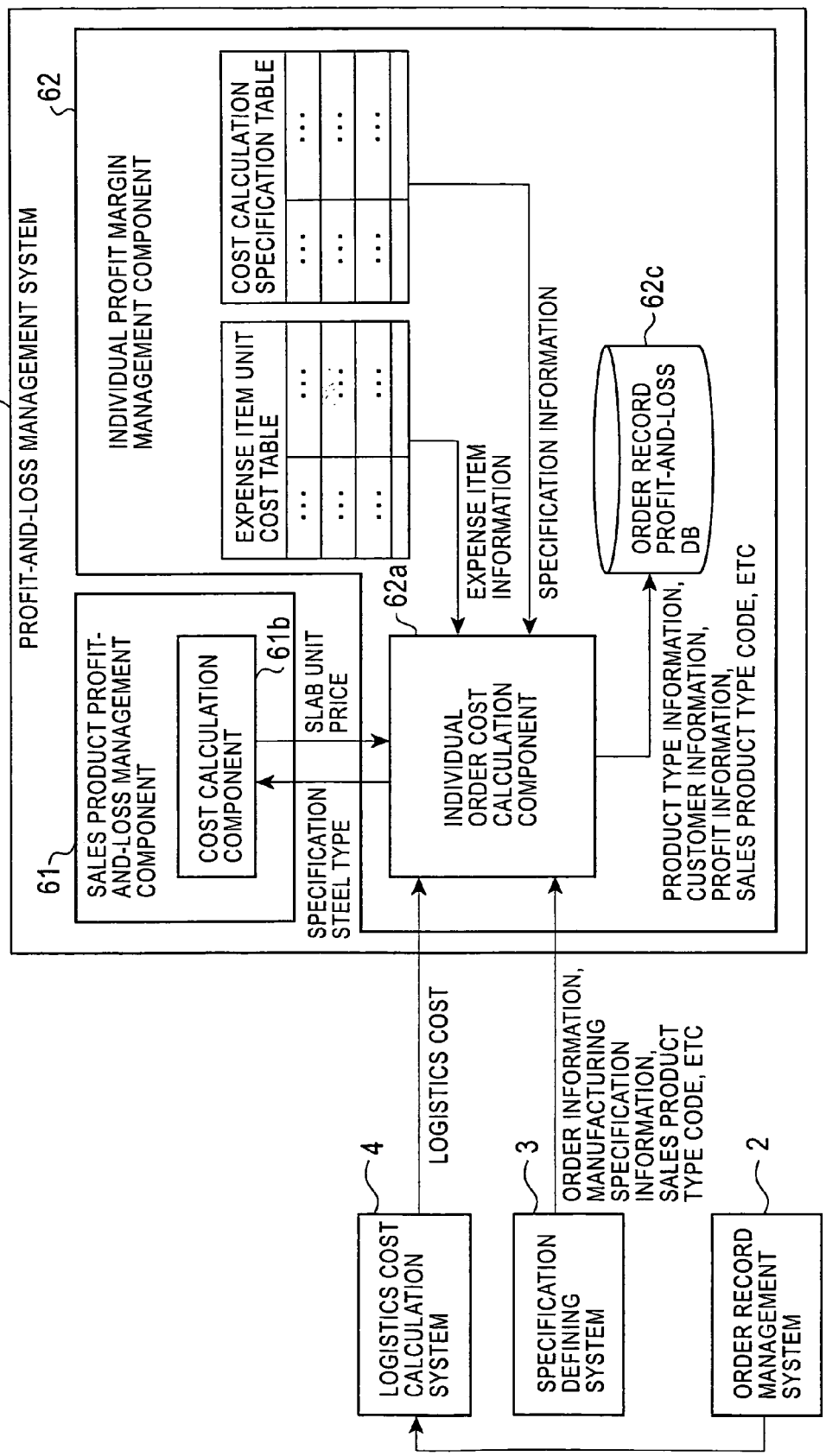
FIG. 9 is a conceptual diagram showing one flow example of various pieces of information caused when a calculation process for ordinary profit, marginal profit, and the like, a memory process for profit information, quality information, and the like are performed in the individual order cost calculation component 62a of the individual profit margin management component 62.
Figure 10:
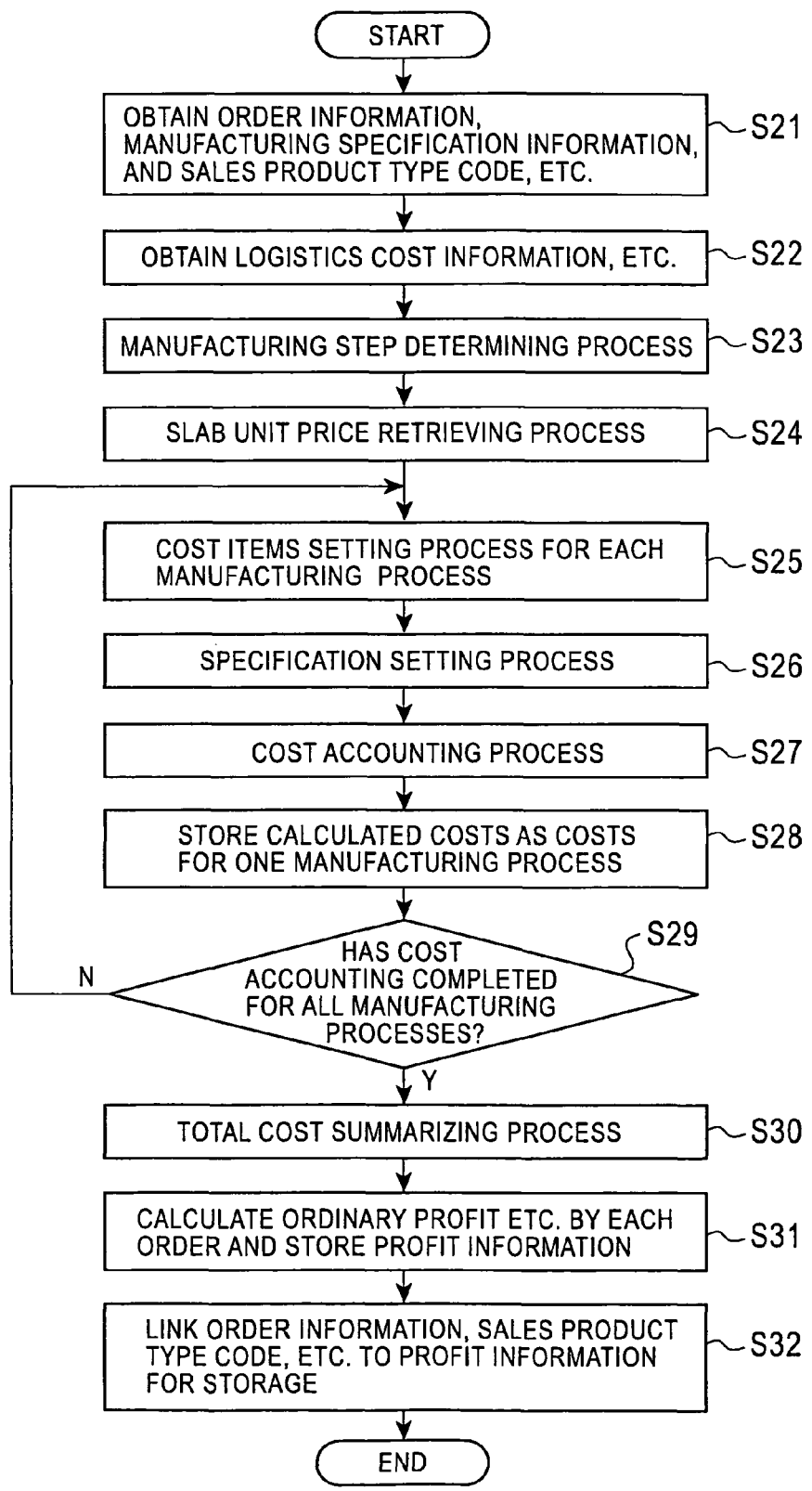
FIG. 10 is a flowchart showing a calculation process, a memory process, and the like of the individual order cost calculation component 62a at that time.

FIG. 9 is a conceptual diagram showing one flow example of various pieces of information caused when the calculation process for the ordinary profit, the marginal profit, etc. and the storing process for the profit information, the product type information, etc. are performed in the individual order cost calculation component 62a of the individual profit margin management component 62. FIG. 10 is a flowchart showing the calculation process, the storing process, etc. of the individual order cost calculation component 62a at that time.

For example, the program for the process is activated in response to a cost accounting start instruction from the user via the operation component, the individual order cost calculation component 62a of the individual profit margin management component 62 requests from the specification defining device 3, the information on the order information, the order number, the manufacturing specification information, the sales product type code, etc., and then receives and obtains the information on the order information, the order number; the manufacturing specification information, the sales product type code, etc., which are output from the specification defining device 3 via the network 8 in response to this request (Step S21).

It should be noted that the manufacturing specification information obtained herein is only information about the costs necessary for the cost accounting. The manufacturing specification information necessary for the manufacturing process influential to the cost calculation, the operation conditions in each manufacturing process, etc. are obtained from the manufacturing specification information including the enormous detailed manufacturing conditions set in the specification defining device 3, for example.

Next, the individual order cost calculation component 62a requests from the logistics cost calculation device 4, the logistics cost by each order, and receives and obtains the information on the logistics cost, etc., which are output from the logistics cost calculation device 4 via the network 8 in response to this request (Step S22).

Herein, in the logistics cost calculation device 4 extracts the information on the logistics expense, for example, the delivery place and transport means for the ordered product, etc., via the order record management device 2 from the order information of the above-mentioned order stored in the order record database 22. On the basis of these pieces of information, the product logistics costs are calculated.

Next, the individual order cost calculation component 62a performs a manufacturing process determining process for determining which manufacturing processes are passed from the obtained manufacturing specification information (Step S23). For example, when the order is a coated steel sheet, the manufacturing processes are as follows "hot rolling→pickling→cold rolling→coating process". The determination of the manufacturing processes (the passing steps) is made on the basis of the predetermined table corresponding to the order in the order information, or the actual manufacturing processes may be input by the user via the operation component.

It should be noted that the processes determined in the manufacturing process determining process do not include processes in the ironmaking and the steelmaking process, and processes after the steelmaking process are determined in the manufacturing process determining process. Also, the costs in the ironmaking and the steelmaking process are calculated in a slab unit price search processes in Step S24.

Next, in the slab unit price search processes in Step S24, the individual order cost calculation component 62a extracts specification steel type information from the obtained manufacturing specification information, and outputs the specification information to the cost calculation component 61b of the sales product profit-and-loss management component 61. The cost calculation component 61b extracts a slab unit price corresponding to the specification steel type, for example, from a slab costs table, and outputs this to the individual order cost calculation component 62a. In this way, the individual order cost calculation component 62a obtains the slab unit price as ironmaking and steelmaking costs.

Next, the individual order cost calculation component 62a performs a individual step expense setting process by searching and obtaining all expense item unit price data(expense item information) corresponding to the costs generated in the manufacturing processes determined in the manufacturing process determining process, for example, from an expense item unit price table previously prepared (stored) (Step S25).

FIG. 11(A) shows an example of the expense item unit price table. As shown in FIG. 11(A), the expense item unit price table defines all the costs in the passing manufacturing processes, that is, the expense item unit price, for example, unit prices of the material costs, by-products, fuel costs, and electric power costs. It should be noted that in FIG. 11(A), "reference table name" indicates which table has the specification data corresponding to each expense item defined among the specification setting table in the specification setting process in Step S26, that is, a referenced specification table name indicating which table should be referenced to search for the corresponding specification data.

Next, in the specification setting process in Step S26, on the basis of the reference specification table name corresponding to each expense item data of the expense item unit price table, the individual order cost calculation component 62a searches for the corresponding cost calculation specification table (previously prepared (stored)) to obtain the specification data (specification information), thereby setting the corresponding specification.

FIG. 11(B) shows an example of the cost calculation specification table. As shown in FIG. 11(B), in the cost calculation specification table, for example, item data of "table name", "condition 1", "condition 2", "specification", "operator", "next reference table name", etc. are defined. In FIG. 11(B), "condition 1" and "condition 2" indicate, for example, manufacturing conditions related to the costs such as a heating temperature condition, a cooling temperature condition, and a steel sheet thickness. In addition, "specification" indicates, for example, electric power costs, the fuel necessary amount, etc. for manufacturing the product related to the order corresponding to the combination of these conditions in the manufacturing process. Then, "operator" indicates which calculation is performed on the specification with respect to the expense item unit price, such as multiplication and division. Moreover, "next reference table name" indicates a reference table destination for setting the next specification.

Next, the individual order cost calculation component 62a performs the calculation process on the specification that has been set in this way with use of the thus obtained expense item unit price and the "operator" in FIG. 11(B) (for example, unit price/specification, unit price×specification) and performs a cost accounting process to calculate the costs in the manufacturing process (Step S27).

Next, the individual order cost calculation component 62a stores the calculated costs as the costs for one manufacturing process in data area corresponding to the order number in the order record profit-and-loss database 62a (Step S28).

Then, when plural manufacturing processes are passed, the costs for all the manufacturing processes need to be calculated. Therefore, the individual order cost calculation component 62a judges whether or not the processes in all the manufacturing processes are completed (Step S29). In this judgment process, for example, from the upstream manufacturing processes, the processes from Processes S25 to Step S28 are performed, and it may be configured to judge whether or not the process in Step S28 is the last manufacturing process in the manufacturing processes determined in the manufacturing process determining process in Step S23.

When the individual order cost calculation component 62a judges that the processes in all the manufacturing processes are not completed in the judgment process (Step S29: Y), the flow returns to Step S25. Then, regarding the next manufacturing process, the processes from Step S25 to Step S28 are repeatedly performed (by the number of the manufacturing processes). Then, when the processes in all the manufacturing processes are completed, the individual order cost calculation component 62a performs the all costs aggregating process for summing and aggregating the total costs that have been calculated so far (Step S30).

Next, the individual order cost calculation component 62a calculates the individual total costs and marginal costs on the basis of the summed and aggregated result, and further on the basis of the above costs and the sales information (calculated by unit price×weight) in the order information, calculates the profit information by each order such as the ordinary profit and the marginal profit to store the thus obtained results in the order record profit-and-loss database 62c (Step S31).

Next, the individual order cost calculation component 62a stores the order information including the product type information and the customer information obtained from the specification defining device 3, the sales product type code, etc., which are not the result of the calculation here, in the order record profit-and-loss database 62c while being linked with the costs and the profit information, etc. (Step S32). In this manner, the above process is ended, and if there is a next order, the above process is similarly executed.

Figure 12:
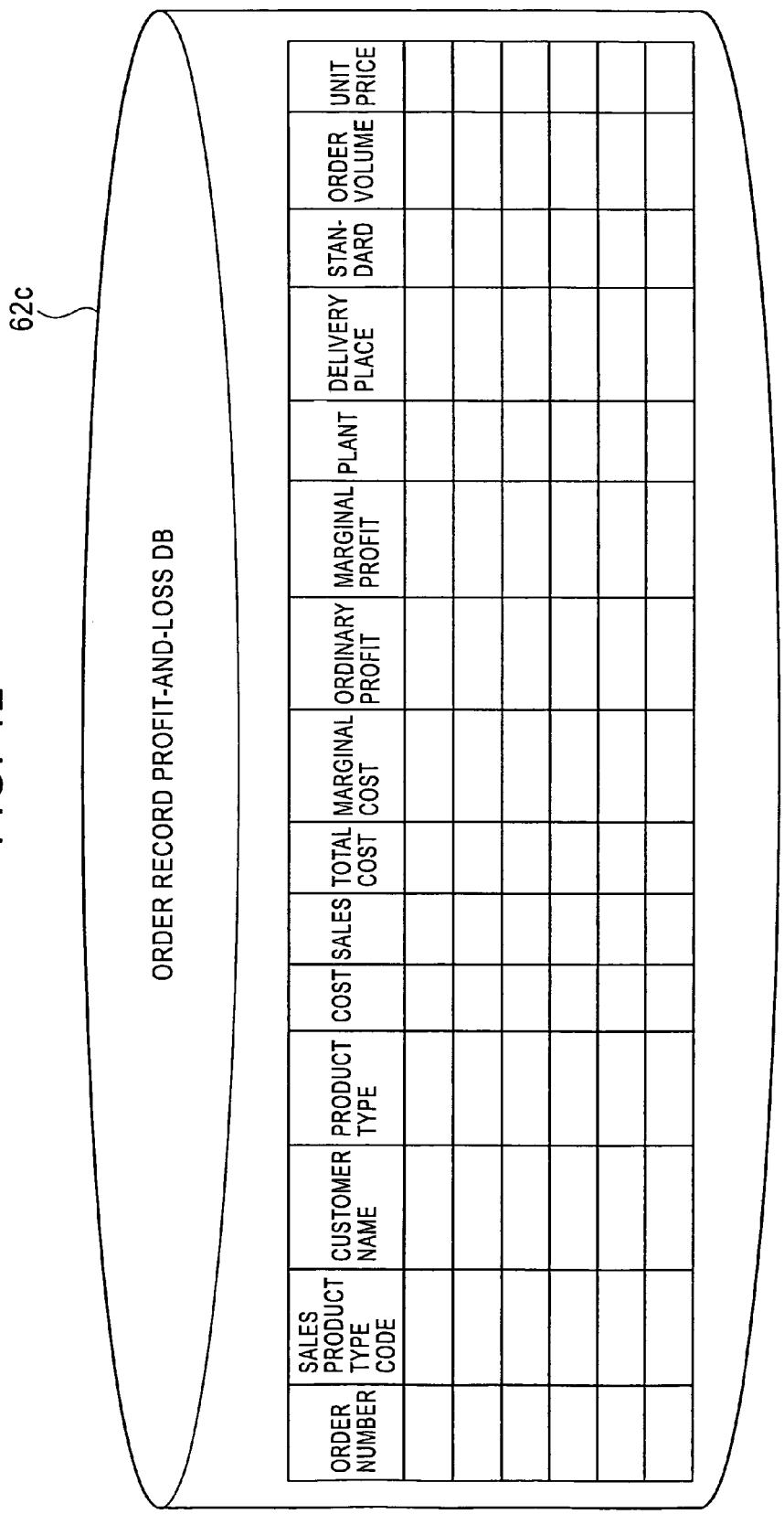
FIG. 12 shows an example of a structure of an order record profit-and-loss database 62c.

FIG. 12 shows an example of a structure of the order record profit-and-loss database 62c. As shown in FIG. 12, in the order record profit-and-loss database 62c, the sales product type code is linked with one order (order number), and further, the order record profit-and-loss database 62c has a data structure with the linkage of information including the product type information (product type), the customer information (the customer name), the costs, the sales, the total costs, the marginal costs, the ordinary profit, the marginal profit, the delivery place, etc. Among these pieces of data, the costs and profit information data is calculated as described above and then stored. As the data on the customer information, the product type information, the sales product type code, the sales, the delivery place, etc., the data obtained from the specification defining device 3, the logistics cost calculation device 4, etc. are stored.

In this way, with effective use of the semi-finished product cost of the sales product type and also even with consideration to the respective passing processes, the costs by each order can be calculated efficiently with high precision. Also, in the cost accounting by each order, as the costs by each order are calculated from a part of information on the manufacturing specification related to the costs, the calculation load can be lightened.

Also, in this way, while the profit-and-loss management by each customer and each product type on the premise of the sector institution is performed, the cost accounting for the business accounting can be efficiently performed by the sales product profit-and-loss management component 61.

5.2.2b. Process of the Search and Process Component 62b

Subsequently, with reference to FIGS. 13 to 15 and the like, outline processes of the search and process component 62b of the individual profit margin management component 62, etc. will be described in detail.

Figure 13:
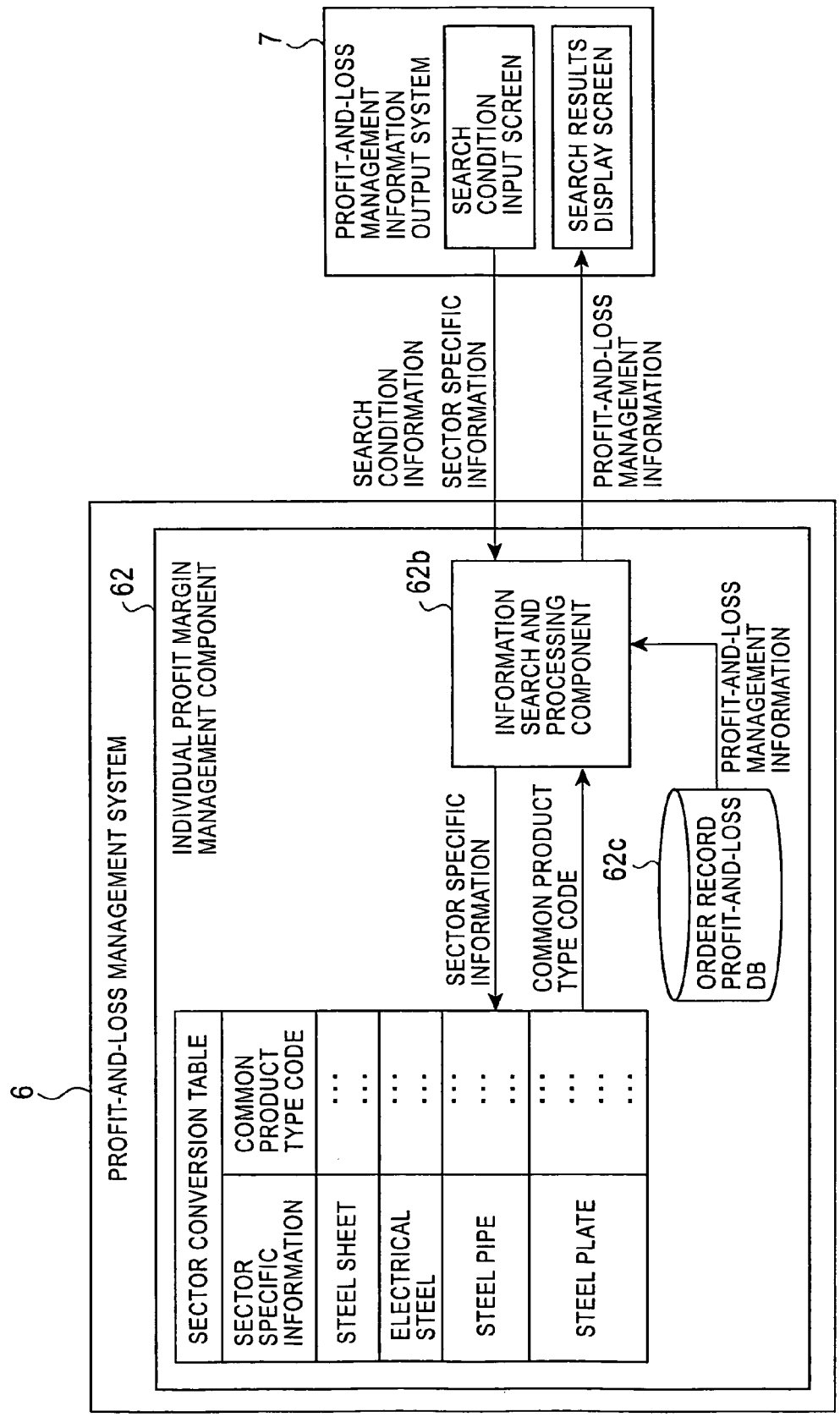
FIG. 13 is a conceptual diagram showing one flow example of various pieces of information caused when a search process and the like are performed in a search and process component 62b of the individual profit margin management component 62.

FIG. 13 is a conceptual diagram showing one flow example of various pieces of information caused when a search process and the like are performed by the search and process component 62b of the individual profit margin management component 62. FIG. 14(A) is a flowchart showing the input and output process, etc. of the profit-and-loss management information output device 7 at that time. FIG. 14(B) is a flowchart showing the search process, etc. of the search and process component 62b, at that time. FIG. 15 shows an search condition input screen example shown on the display component of the profit-and-loss management information output device 7.

Figure 15:
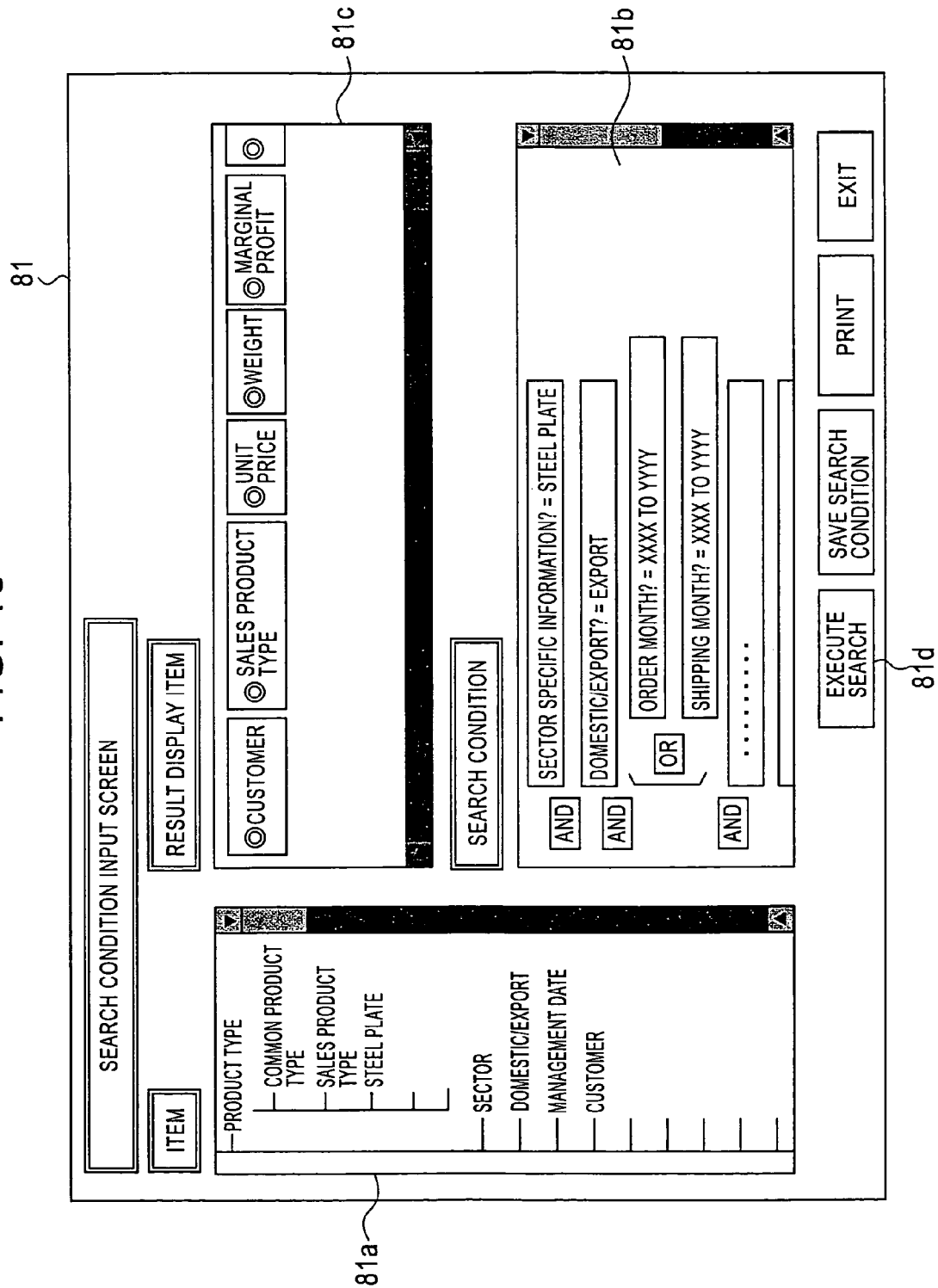
FIG. 15 shows a search condition input screen example displayed on a display component of the profit-and-loss management information output device 7.

First of all, in the profit-and-loss management information output device 7, for example, the program related to the process is activated in response to the profit-and-loss management information presentation start instruction via the operation component from the user (for example, the sector manager), the search condition input screen shown in FIG. 15 is displayed on the display component of the profit-and-loss management information output device 7. In a search condition input screen 81 shown in FIG. 15, a search item setting column 81a for selecting a search item, a search conditional expression setting column 81b for setting a search conditional expression, a result display item selection column 81c for selecting a search result display item, a search execution button for executing a search 81d, etc. are provided.

In the search condition input screen 81, the user operates the operation component to set and input search items of the sector, the sales section, the product type, the customer, etc. from the search item setting column 81*a*. Subsequently, when the search conditional expression setting column 81*b* is used to set and input the search condition expression, for example, "AND" condition, "OR" condition, etc. of the combination condition by each search item, the profit-and-loss management information output device 7 obtains these search conditions (Step S41).

For example, in the first stage, the user inputs the classification conditions at a large scale like the sector, the common product type, the sales product type, the individual specification size, etc. (specification of the product type classification scale). These large scale classification conditions are provided in the search item setting column 81*a*, so the user selects from the above conditions in accordance with the classification to be analyzed. In the second stage, the user sets a product type further narrowing condition, for example, a condition for narrowing to the automobile application or to the cold annealing, etc., in the search condition expression setting column 81*b* as more detailed level conditions at the selected product type classification scale. It should be noted that the user may further specify (select) one specific product type at the same product type classification scale, or may specify all (the secondary product type narrowing at the product type classification scale is only a sector condition). A part or all of the search conditions selected and set at in first and second stages are the product type conditions. It should be noted that as the further search conditions, the customer, the domestic/export use (by each exporting country), the order month and date range, etc. may be set.

Also, the user operates the operation component to select the search result display item (item shown in FIG. 17) from the result display item selection column 81*c*.

In this manner, after the user operates the operation component to select and set the search condition, the search result display item, etc., for example, by specifying (clicking) the search execution button 81*d* provided to the search condition input screen 81 with use of the operation component (for example, a mouse), in response to this (Step S42: Y), the profit-and-loss management information output device 7 transmits (outputs) the sector specific information and the search condition information at least including the product type condition along with the search execution instruction via the network 8 to the profit-and-loss management device 6 (Step S43).

In contrast, when the profit-and-loss management device 6 accepts (receives) the sector specific information, search condition information, search execution instruction, etc., from the profit-and-loss management information output device 7 (Step S51), the search and process component 62*b* of the individual profit margin management component 62 reads the customer information, the product type information, the profit information, etc., of an order matching the search condition information and an order belonging to the sector matching the sector specific information, from the order record profit-and-loss database 62*c* (Step S52).

For example, the search and process component 62*b* of the individual profit margin management component 62 obtains the common product code corresponding to the received sector specific information, as shown in FIG. 13, with reference to a previously prepared (stored) table showing a corresponding relation between the sector specific information and the common product code (hereinafter, referred to as "sector conversion table"), and reads the customer information, the product type information, the profit information, etc., of the order corresponding to the common product code from the order record profit-and-loss database 62*c*.

It should be noted that the sector specific information is specified by the profit-and-loss management information output device 7 and should not necessarily be transmitted to the profit-and-loss management device 6. For example, such a structure may be adopted that the individual profit margin management component 62 receives the search condition information together with the identification information of the profit-and-loss management information output device 7 and, for example, with reference to a table showing a corresponding relation between the identification information of the previously prepared (stored) profit-and-loss management information output device 7 and the sector specific information, the sector specific information corresponding to the identification information of the profit-and-loss management information output device 7 that transmits search condition information is specified.

Next, the search and process component 62*b* sorts the read product type information by each product type indicated in the product type condition, and aggregates the profit information corresponding to the product type information sorted by each product type of the product type classification scale (for example, all the profits are added or averaged out) (Step S53).

It should be noted that it may be possible that the search and process component 62*b* sorts the product type information by each product type of the product type classification scale indicated in the product type condition, further sorts the product type information by each customer indicated in the customer information, and aggregates the profit information corresponding to the product type information by each product type and by each customer.

Herein, when the product type classification scale indicated in the product type condition corresponds, for example, to the common product type, the search and process component 62*b* uses the common product code corresponding to each order to perform sorting by each product type, and when the product type classification scale indicated in the product type condition corresponds, for example, to the sales product type indicated in the sales product type code, the search and process component 62*b* uses the sales product type code corresponding to each order to perform sorting by each product type.

Figure 16:
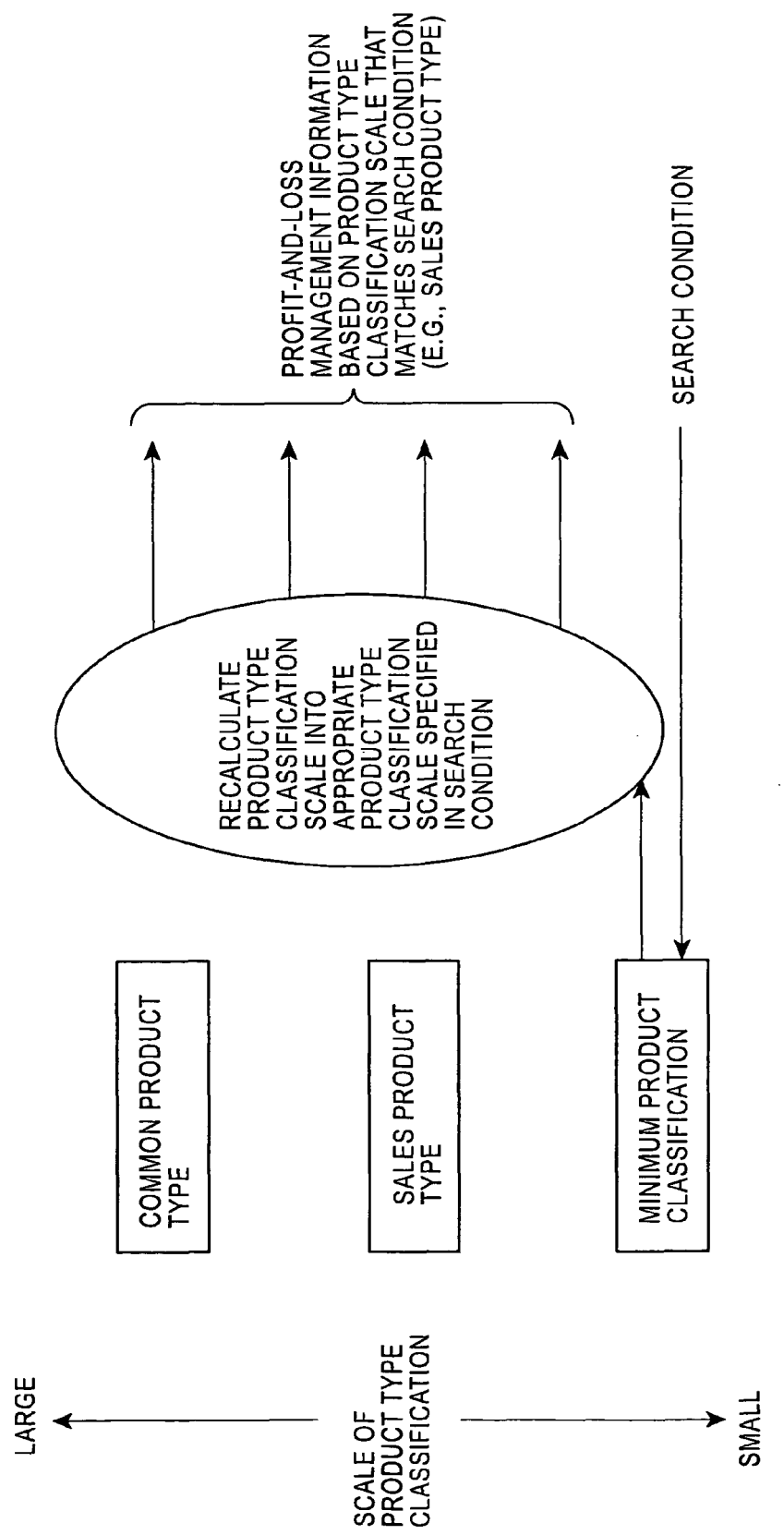
FIG. 16 shows an example of a concept for sorting by product types on the basis of a product type classification scale indicated in a product type condition.

FIG. 16 shows a concept example of sorting by each product type at the product type classification scale indicated in the product type condition. In the order record profit-and-loss database 62*c*, the profit-and-loss information, etc. by each order unit are stored, the profit-and-loss information at any product type classification scale can be taken out. For example, when the search conditions are specified in accordance with the purpose of the search or by setting appropriately sorting by each customer and by each product type, group sorting is made by each product type classification specifying the information by each customer unit and by each order unit at the product type classification. Each data such as sales, costs, profit, etc., by each order is aggregated, whereby the order profit-and-loss information at any product type classification scale can be produced. In actual, for the convenience for the user, as the classification condition in the first stage, as described above, in addition to the sales product type and the common product type, the product types at several levels are previously set and can be selected and input.

Next, the search and process component 62*b* presents the aggregated profit information, etc., for example, by each product type and by each customer to the user as profit-and-loss management information via the profit-and-loss management information output device 7. That is, the search and process component 62b transmits the profit-and-loss management information via the network 8 to the profit-and-loss management information output device 7 (Step S54). In contract, when the profit-and-loss management information output device 7 accepts (receives) from the profit-and-loss management device 6 the profit-and-loss management information (Step S44: Y), the profit-and-loss management information is sorted into information by each search result display item thus selected. The information is then displayed as the search result to be displayed on the display component and presented to the user (Step S45).

FIG. 17 shows a search result display screen example displayed on the display component of the profit-and-loss management information output device 7. On a search result display screen 82 shown in FIG. 17, the profit information like the ordinary profit, the marginal profit, etc. is sorted by each customer and by each sales product type. Herein, customers A, B, C, and D are shown. For example, as the sales product type handled by the cold rolled sheet and strip business planning department, cold rolled and annealed steel (only the annealing process of the cold-rolled steel), hot-dip galvanized steel, electric coated steel are respectively shown (it should be noted that the sales product types exemplified in FIG. 17 are for the sake of convenience of the description).

It should be noted that the sales product type herein, for example, in the sales product type of cold annealing, when segmentalized, as the product type of the further detailed classification, such as for the automobile, or further divided into an outer panel for the automobile, an inner panel, steel sheet strength, size, etc. For example, in the customer A, all the data of the minimum product classification unit (to be specific, the order in this embodiment) where the sales product type corresponds to the cold annealing are extracted. According to each data of the costs and profit, the result data subjected to the aggregating process of addition, averaging, etc. is displayed on the search result display screen 82 (hot dip galvanized steel sheet, electric coated steel sheet, etc. are also subjected to the similar process). Herein, the sales product type is described, but depending on which level of the analysis is performed, the results are sorted by selecting and setting the detailed product type classification or large product type classification.

Then, the search result display screen 82 shown in FIG. 17, for example, the customer A has the order record of cold annealed, hot-dip galvanized, and electric galvanized as the product type of the cold-rolled steel, but the customer B has only the order of cold annealed and hot-dip galvanized. Thus, there is no data on electric coating. The customer C has only the order of hot-dip galvanized and electric galvanized, so there is no data on cold annealed, which is therefore not displayed. In this way, not only by each customer but also by each ordered product type among the customers (by each customer and by each product type), the profit-and-loss status can be understood.

It should be noted that in the search condition input screen 81, when the search condition is input, for example, as the product type classification scale, the sales product type is selected, and further, as the secondary product type condition, a particular commercial product type, for example, cold annealed is input (it should be noted that in this case, the product type condition input at the first stage (the sales product type) can also be omitted), the product type column 82a in the search result display screen 82 shown in FIG. 17, cold annealed is all displayed, by each customer and by each product type, the combination of the customer (any of A, B, C, etc.) and cold annealed is set.

In addition, in the order record profit-and-loss database 62c, for each order, several tens to several hundreds of pieces of data are stored as the information item. Thus, it may be structured such that the search and process component 62b obtains only the data of the information item necessary for the analysis, for example, only the search result display item in the search result display screen 82 from the order record profit-and-loss database 62c and transmits the data to the profit-and-loss management information output device 7, or the search and process component 62b obtains all items in the data by each order and transmits the data to the profit-and-loss management information output device 7. When the profit-and-loss management information output device 7 displays the search results, only the search result display items may be displayed on the search result display screen 82.

Also, when all the items cannot be displayed at once, the confirmation can be made through scaling display or scroll in the up, down, left, and right directions.

Furthermore, the sorting process by each product type, etc., in Step S53, and the aggregating process on the profit information may be conducted in the profit-and-loss management information output device 7 instead of the search and process component 62b. In this case, the search and process component 62b transmits the customer information, the product type information, profit information, etc., read from the order record profit-and-loss database 62c in Step S52 via the network 8 to the profit-and-loss management information output device 7.

Subsequently, in accordance with the analysis instruction by the user via the operation component, the analysis process on the data of the search result is performed (Step S46) in the profit-and-loss management information output device 7. In the analysis process, depending on each type purpose, various processings can be conducted. For example, the profit-and-loss management information output device 7 functions as the profit rearranging means to rearrange the profit information in the search result data in the ascending manner from the small profit, and display the profit information up to the predetermined order on the search result display screen 82. For example, a sort process is performed so that the order of the month by each order is rearranged in terms of the marginal profit or the order of the ordinary profit in the corresponding sector (or aggregated by each product type). While the user checks the rearranged results, the user can understand the profit status by each order (the product type), and it is possible to easily clarify product types in an unsatisfactory profit-and-loss status, whereby the profit-and-loss improvement actions can be studied on there product types with focus. It should be noted that in the rearranging process, the predetermined number of the product types, that is, only 30 product types or only 20 product types in the ascending order of the marginal profit, etc., may be displayed or printed. Moreover, by setting a condition, that is, only for the product types with the deficit balance in the marginal profit, etc. or only for the product types with the profit amount equal to or less than the predetermined amount, etc., the product types matching the condition may be displayed or printed.

It should be noted that the analysis process on such data, for example, the rearranging process on the profit information in the ascending order of the profit may be executed in the search and process component 62b of the profit-and-loss management device 6, for example, instead of the profit-and-loss management information output device 7.

Then, the analysis result is output in the form of a ledger sheet when a print button 82b provided to the search result display screen 82 is clicked by a mouse, etc. Also, to save the analysis result as data, if a save button 82c is clicked, data save can be made in the memory component. Then, in accordance with the operation of the operation component by the user, when the search condition is changed for searching again, the flow returns to Step S41. When the re-search is not performed, the process is ended.

As a result, for example, in the sector management section, on the basis of the profit-and-loss management information in the ascending order of the small marginal profit, the product types with the small marginal profit in the top-ranked predetermined number are set as the profit-and-loss improvement study target for conducting studies.

That is, the product types with the small marginal profit are analyzed to find whether the problem to be improved resides in the costs or the price. Then the proposed measures are drafted. For example, regarding the cost, it is to be found whether a part of the manufacturing processes should be changed, for example, the change from BAF to CAL achieves cost reduction, the product manufactured at an steelworks in East Japan is to be manufactured at an steelworks in West Japan for reducing the transport costs of the product type for export to Asia, and the like.

Then, regarding the price, for example, a study is considered on price advance negotiation to the customer for the product type, of which price is fixed, even in a circumstances that prices of commodities are generally increased.

For example, the sector manager (leader) of the sector management section informs all the members in the sector of the studied profit-and-loss improvement measures by appointing a person in charge of the measures. For example, in the case of the cost reduction through the change of manufacturing processes in steelworks, communication and instructions are made to the corresponding productive section in the steelworks. In the case of the cost reduction measures across plural steelworks, adjustment between the steelworks is conducted and the responsible steelworks is caused to execute the proposed measures. Also, in the case of price negotiation with the customer or the like, the corresponding sales section is informed of that effect.

As described above, according to the above-mentioned embodiment such a structure is adopted that a sector is provided which is an inter-organ and virtual organization from the productive section to the sales section and also has a responsibility for the individual product type profit-and-loss management, and profit-and-loss management information by each product type and each customer is presented for the sector, whereby for a product type with an unsatisfactory profit-and loss, the respective departments related to the product type can make actions in an integrated manner. The sector leader can instruct the most appropriate department to execute proposed measures.

Also, even in the material producing company using the main starting materials where the actual manufacturing organizations need to be set up by each manufacturing process, it is possible to perform the profit-and-loss improvement activity with the manufacturing department and the sales and marketing department in an integrated manner. In particular, the manufacturing side can contribute while focusing on the cost reduction related to the commercial product type, and the sales and marketing side can contribute while focusing on the pricing improvement or the like. Also, as the sector is an inter-organ organization in view of the product type and if there are plural steelworks, the sector strides across all of them, it is possible to easily take measures such as switching the manufacturing places for a product type with an unsatisfactory profit-and-loss.

Moreover, the profit-and-loss management information output to the sector is output in the ascending order of the marginal profit, it is possible to perform an intensive study on the product type group with low profitability.

Figure 14:
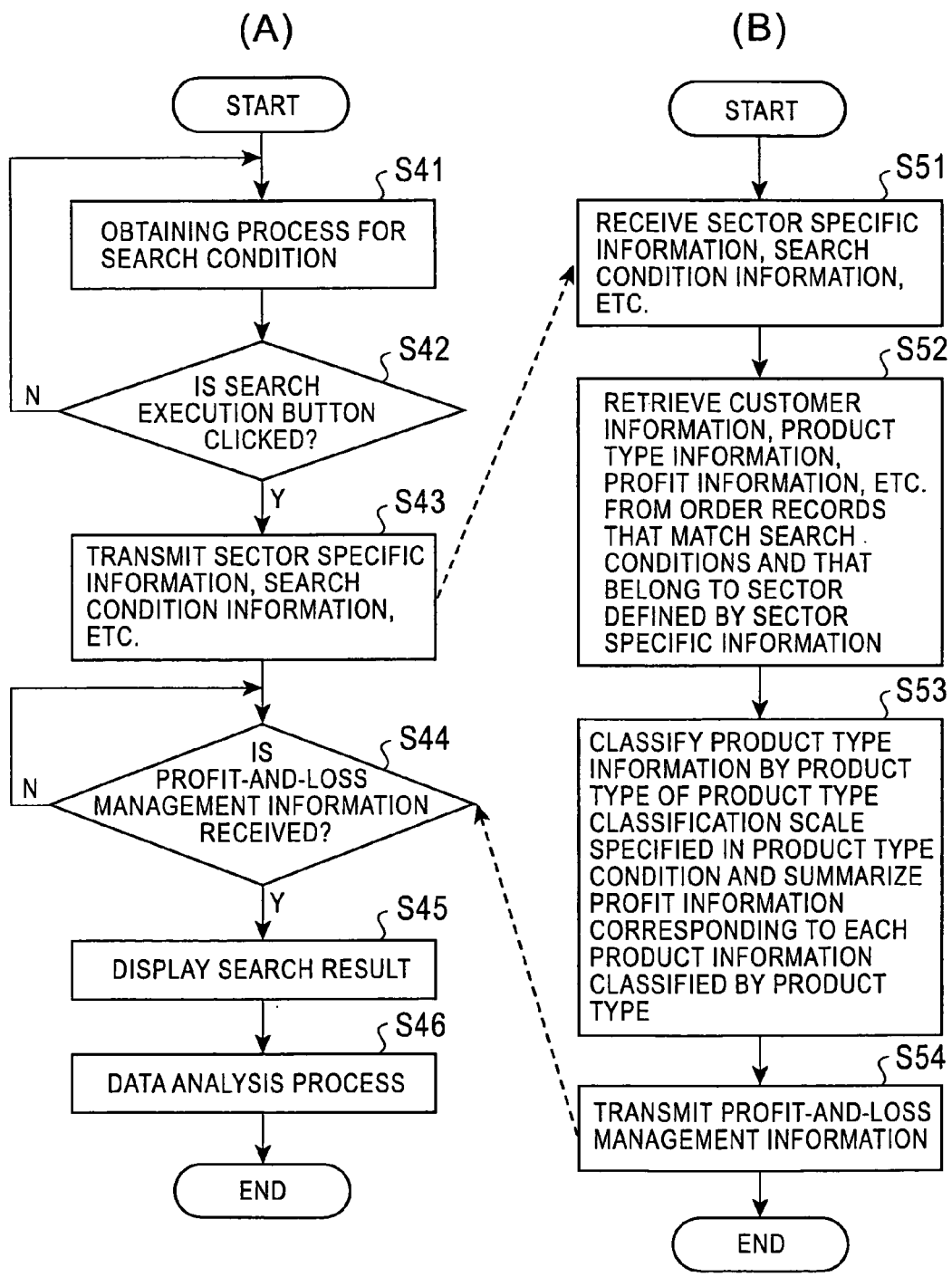
FIG. 14(A) is a flowchart showing an input and output process and the like of the profit-and-loss management information output device 7 at that time.
FIG. 14(B) is a flowchart showing a search process and the like of the search and process component 62b at that time.

It should be noted that in the process shown in FIG. 14, along with the individual profit information generated by the individual profit margin management component 62, the profit information by each sales product type generated by the sales product profit-and-loss management component 61 may be presented from the profit-and-loss management information output device 7. This is a different view from the profit-and-loss management by each order and by each customer. For example, when half year profit planning and monthly record display and analysis by each sales product type are performed, the profit-and-loss management information output device 7 requests the sales product profit-and-loss management component 61 for the profit-and-loss data by the sales product type classification calculated in the sales product profit-and-loss management component 61. Then, the sales product profit-and-loss management component 61 obtains the data from the profit-and-loss management database 61c to send (present) the data to the profit-and-loss management information output device 7. The profit-and-loss management information output device 7 presents the data to the user (to be displayed on the display component) and also on the basis of this data, can conduct the profit-and-loss analysis and display by the sales product type unit or by the common product type unit to which the calculation for grouping the data in the sales product classification by each common product type.

So far, an embodiment of the present invention has been described, but a specific structure of the present invention is not limited to the above-mentioned embodiments. Even there is a setting change or the like without departing from a general idea of the present invention, such a case is within the scope of the present invention.

As has been described above, the case of applying the present invention to a field of the raw material producing company using the main starting materials and manufacturing various basic materials as the products has been described as an example, but other than this case, the present invention can be applied to the above-mentioned sector institution or a field adopting a similar institution.

The invention claimed is:

1. A profit-and-loss management information presentation method of presenting profit-and-loss management information used for profit-and-loss management in a material producing company that uses common main starting materials and produces various basic materials as products and that includes both a productive section and a sales section and is a virtual inter-organ organization for performing profit-and-loss management for the products by each product type, comprising:

a profit-and-loss storing step of linking at least product type information and profit information to each other by each order of products with order record to be stored in an order record profit-and-loss database;

an information search step of accepting specific information on the virtual inter-organ organization and search condition information at least including product type condition, and reading from the order record profit-and-loss database, at least product type information and profit information on an order matching the search condition information and on an order belonging to the virtual inter-organ organization matching the specific information on the virtual inter-organ organization;

a profit information aggregating step of sorting the product type information by each product type of a product type classification scale indicated in the product type condition and aggregating profit information corresponding to respective product information sorted by each product type; and a profit-and-loss management information presentation step of presenting the aggregated profit information by each product type as the profit-and-loss management information, wherein each step is executed by a computer, the product type condition is a condition that indicates a scale of a product type classification, the product type classification is derived from the common main starting materials, and the common main starting materials include at least one of iron ore, iron and steel.

2. The profit-and-loss management information presentation method according to claim 1, wherein the profit-and-loss storing step includes linking the product type information and the profit information to customer information by each product order to be stored in the order record profit-and-loss database, the information searching step includes reading the customer information of the order together with the product type information and the profit information, the profit information aggregating step includes sorting the product type information by each product type of a product type classification scale indicated in the product type condition and further sorting the product type information by each customer indicated in the customer information and aggregating profit information corresponding to each product type information sorted by each product type and each customer, and the profit-and-loss management information presentation step includes presenting the aggregated profit information by each product type and each customer as the profit-and-loss management information.

3. The profit-and-loss management information presentation method according to claim 1, further comprising a profit rearranging step of rearranging the profit information aggregated in the profit information aggregating step in a profit ascending order, wherein the profit-and-loss management information presentation step further includes presenting the profit information in an order from the smallest profit to a predetermined rank as the profit-and-loss management information.

4. The profit-and-loss management information presentation method according to claim 1, wherein the profit-and-loss storing step includes grouping a plurality of minimum product classification units of the individual specification size corresponding to the order, and further, linking to the order a product type code representing a product type grouped so as not to be treated by the plurality of virtual inter-organ organization and storing the product type code in the order record profit-and-loss database, and the information searching step includes obtaining with reference to the product type code, a table representing a corresponding relation with the virtual inter-organ organization and a product type code corresponding to specific information on the virtual inter-organ organization and reading at least product type information and profit information of an order corresponding to the product type code from the order record profit-and-loss database.

5. The profit-and-loss management information presentation method according to claim 4, wherein the product type code is obtained by grouping a plurality of minimum product classification units of the individual specification size so as not to be treated by the plural virtual inter-organ organizations, and further, the product type code is a sales product type code including:

a common product code representing the common product type including an information item related to sales management; and a cost management classification code including an information item where a cost difference is occurred, and the profit information aggregating step includes when the product type classification scale indicated in the product type condition corresponds to the common product type, using the common product type code corresponding to each order to perform sorting by each product type, and when the product type classification scale indicated in the product type condition corresponds to the sales product type indicated in the sales product type code, using a sales product type code corresponding to each order to perform sorting by each product type.

6. The profit-and-loss management information presentation method according to claim 4, further comprising:

a cost accounting step of performing cost accounting by each product type of the product type classification scale indicated in the product type code;

an individual order profit-and-loss calculation step of calculating costs, sales, and profit by each order of a product with an order record; and an account information output step of outputting costs by each product type corresponding to the product type code calculated in the cost accounting step, as account information used for business accounting of the material producing company, wherein the profit-and-loss storing step includes storing the profit by each order calculated in the individual order profit-and-loss calculation step in the order record profit-and-loss database as the profit information.

7. The profit-and-loss management information presentation method according to claim 4, wherein the product type code is obtained by grouping a plurality of minimum product classification units of the individual specification size so as not be treated by the plural virtual inter-organ organizations, and further, the product type code includes the common product type code representing the common product type including an information item related to sales management and a cost management classification code including an information item where a cost difference is occurred, with respect to the sales plan information drafted by the common product type unit, by each common product type, from the sales plan information database where the common product type code is assigned for storage, the sales plan information is read in response to a read request for the production plan draft, and on the basis of the sales plan information, each common product type is developed into the sales product type to be output in the sales plan information output step, the production plan information drafted by the sales product type classification is obtained together with raw material costs and department expenses corresponding to the production plan information in the production plan information obtaining step, on the basis of the obtained production plan information, cost accounting is performed by each sales product type in the cost accounting step, costs, sales, and profit by each order of a product with an order record are calculated in the individual order profit-and-loss calculation step, the costs by each product type corresponding to the product type code calculated in the cost accounting step are output to be used for business accounting of the material producing company as account information in the account information output step, and the profit by each order calculated in the individual order profit-and-loss calculation step is stored as the profit information in the order record profit-and-loss database in the profit-and-loss storing step.

8. The profit-and-loss management information presentation method according to claim 7, further comprising a profit planning value calculation step of calculating a profit plan value by each sales product type or a profit plan value by each common product type calculated from the plan value on the basis of the costs by each sales product type calculated in the cost accounting step and sales information by each sales product type included in the sales plan information drafted in the sales product type classification.

9. The profit-and-loss management information presentation method according to claim 6, wherein the individual order profit-and-loss calculation step obtains parts of order information and manufacturing specification information by each order, identifying on the basis of the part of the manufacturing specification information, at least a semi-finished product such as a slab or a billet that should be used and a manufacturing process that should be passed by each order, inputting costs of the semi-finished product calculated in the cost accounting step, adding to the costs, expenses generated in the respective passing steps for the product related to the order to calculate costs by each order, and calculating profit by each order on the basis of sales included in order entry information of the order and costs by each order calculated in the individual order profit-and-loss calculation step.

10. The profit-and-loss management information presentation method according to claim 5, further comprising:
a common product type determining step of obtaining order entry information of the order, extracting an information item related to sales management from the order entry information, referring to a table representing a corresponding relation between the information item related to the sales management and a common product type code, and determining the common product type code corresponding to the extracted information item;
a manufacturing specification determining step of obtaining order entry information of the order, extracting an information item related to product manufacturing from the order entry information, referring to a table representing a corresponding relation between the information item related to the product manufacturing and a manufacturing specification information, and determining the manufacturing specification information corresponding to the extracted information item;
a cost management classification determining step of extracting an information item where a cost difference is occurred from the determined manufacturing specification information, referring to a table representing a corresponding relation between the information item where the cost difference is occurred and a cost management classification code, determining the cost management classification code corresponding to the extracted information item; and
a sales product type determining step of determining a sales product type code on the basis of the determined common product type code and the cost management classification code.

11. A non-transitory computer-readable medium having a computer-executable profit-and-loss management information processing program embedded thereon, the program causing a computer to execute the method comprising:
a profit-and-loss storing step of linking at least product type information and profit information to each other by each order of products with order record to be stored in an order record profit-and-loss database;
an information search step of accepting specific information on the virtual inter-organ organization and search condition information at least including product type condition, and reading from the order record profit-and-loss database, at least product type information and profit information on an order matching the search condition information and on an order belonging to the virtual inter-organ organization matching the specific information on the virtual inter-organ organization;
a profit information aggregating step of sorting the product type information by each product type of a product type classification scale indicated in the product type condition and aggregating profit information corresponding to respective product information sorted by each product type; and
a profit-and-loss management information presentation step of presenting the aggregated profit information by each product type as the profit-and-loss management information,
wherein each step is executed by a computer,
the product type condition is a condition that indicates a scale of a product type classification,
the product type classification is derived from the common main starting materials, and
the common main starting materials include at least one of iron ore, iron and steel.

12. A profit-and-loss management information presentation device for presenting profit-and-loss management information used for profit-and-loss management in a material producing company that uses common main starting materials and produces various basic materials as products and that includes both a productive section and a sales section and is a virtual inter-organ organization for performing profit-and-loss management for the products by each product type, comprising:
profit-and-loss storing means for linking at least product type information and profit information to each other by each order of products with order record to be stored in an order record profit-and-loss database;
information search means for accepting specific information on the virtual inter-organ organization and search condition information at least including product type condition, and reading from the order record profit-and-loss database, at least product type information and profit information on an order matching the search condition information and on an order belonging to the virtual inter-organ organization matching the specific information on the virtual inter-organ organization;
profit information aggregating means for sorting the product type information by each product type of a product type classification scale indicated in the product type condition and aggregating profit information corresponding to respective product information sorted by each product type; and
profit-and-loss management information presentation means for presenting the aggregated profit information by each product type as the profit-and-loss management information,
wherein the product type condition is a condition that indicates a scale of a product type classification,
the product type classification is derived from the common main starting materials, and
the common main starting materials include at least one of iron ore, iron and steel.

13. The profit-and-loss management information presentation device according to claim 12, wherein the profit-and-loss storing means links the product type information and the profit information to customer information by each product order to be stored in the order record profit-and-loss database, the information searching means reads the customer information of the order together with the product type information and the profit information, the profit information aggregating means sorts the product type information by each product type of a product type classification scale indicated in the product type condition and further sorting the product type information by each customer indicated in the customer information and aggregating profit information corresponding to each product type information sorted by each product type and each customer, and the profit-and-loss management information presentation means presents the aggregated profit information by each product type and each customer as the profit-and-loss management information.

14. The profit-and-loss management information presentation device according to claim 12, further comprising profit rearranging means for rearranging the profit information aggregated by the profit information aggregating means in a profit ascending order, wherein the profit-and-loss management information presentation means further presents the profit information in an order from the smallest profit to a predetermined rank as the profit-and-loss management information.

15. The profit-and-loss management information presentation device according to claim 12, wherein the profit-and-loss storing means groups a plurality of minimum product classification units of the individual specification size corresponding to the order, and further, links to the order a product type code representing a product type grouped so as not to be treated by the plurality of virtual inter-organ organization and stores the product type code in the order record profit-and-loss database, and the information searching means obtains with reference to the product type code, a table representing a corresponding relation with the virtual inter-organ organization and a product type code corresponding to specific information on the virtual inter-organ organization and reads at least product type information and profit information of an order corresponding to the product type code from the order record profit-and-loss database.

16. The profit-and-loss management information presentation method according to claim 15, further comprising:
    cost accounting means for performing cost accounting by each product type of the product type classification scale indicated in the product type code;
    individual order profit-and-loss calculation means for calculating costs, sales, and profit by each order of a product with an order record; and
    account information output means for outputting costs by each product type corresponding to the product type code calculated by the cost accounting means, as account information used for business accounting of the material producing company,
    wherein the profit-and-loss storing means stores the profit by each order calculated by the individual order profit-and-loss calculation means in the order record profit-and-loss database as the profit information.

17. The profit-and-loss management information presentation method according to claim 15, wherein the product type code is obtained by grouping a plurality of minimum product classification units of the individual specification size so as not be treated by the plural virtual inter-organ organizations, and further, the product type code includes the common product type code representing the common product type including an information item related to sales management and a cost management classification code including an information item where a cost difference is occurred, with respect to the sales plan information drafted by the common product type unit, by each common product type, from the sales plan information database where the common product type code is assigned for storage, the sales plan information is read in response to a read request for the production plan draft, and on the basis of the sales plan information, each common product type is developed into the sales product type to be output by the sales plan information output means, the production plan information drafted by the sales product type classification is obtained together with raw material costs and department expenses corresponding to the production plan information by the production plan information obtaining means, on the basis of the obtained production plan information, cost accounting is performed by each sales product type by the cost accounting means, costs, sales, and profit by each order of a product with an order record are calculated in the individual order profit-and-loss calculation, the costs by each product type corresponding to the product type code calculated by the cost accounting means are output to be used for business accounting of the material producing company as account information by the account information output means, and the profit by each order calculated by the individual order profit-and-loss calculation means is stored as the profit information in the order record profit-and-loss database by the profit-and-loss storing means.

18. The profit-and-loss management information presentation method according to claim 17, further comprising:
    common product type determining means for obtaining order entry information of the order, extracting an information item related to sales management from the order entry information, referring to a table representing a corresponding relation between the information item related to the sales management and a common product type code, and determining the common product type code corresponding to the extracted information item;
    manufacturing specification determining means for obtaining order entry information of the order, extracting an information item related to product manufacturing from the order entry information, referring to a table representing a corresponding relation between the information item related to the product manufacturing and a manufacturing specification information, and determining the manufacturing specification information corresponding to the extracted information item;
    cost management classification determining means for extracting an information item where a cost difference is occurred from the determined manufacturing specification information, referring to a table representing a corresponding relation between the information item where the cost difference is occurred and a cost management classification code, determining the cost management classification code corresponding to the extracted information item; and
    sales product type determining means for determining a sales product type code on the basis of the determined common product type code and the cost management classification code.

19. The profit-and-loss management information presentation method according to claim 1, wherein the specific information is information of an order of products made of the common main starting materials.

20. The profit-and-loss management information presentation device according to claim 12, wherein the specific information is information of an order of products made of the common main starting materials.

* * * * *